US012795155B2

United States Patent

(12) United States Patent
Skupin et al.
(10) Patent No.: US 12,795,155 B2
(45) Date of Patent: Nov. 10, 2026

(54) PICTURE/VIDEO CODING SUPPORTING VARYING RESOLUTION AND/OR EFFICIENTLY HANDLING REGION-WISE PACKING

(71) Applicant: Fraunhofer-Gesellschaft zur Förderung der angewandten Forschung e.V., Munich (DE)

(72) Inventors: Robert Skupin, Berlin (DE); Cornelius Hellge, Berlin (DE); Valeri George, Berlin (DE); Thomas Schierl, Berlin (DE); Yago Sánchez De La Fuente, Berlin (DE); Karsten Sühring, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 146 days.

(21) Appl. No.: 18/970,629

(22) Filed: Dec. 5, 2024

(65) Prior Publication Data

US 2025/0097457 A1 Mar. 20, 2025

Related U.S. Application Data

(63) Continuation of application No. 18/090,340, filed on Dec. 28, 2022, now Pat. No. 12,206,893, which is a (Continued)

(30) Foreign Application Priority Data

Feb. 20, 2018 (EP) .................................... 18157718

(51) Int. Cl.
*H04N 19/587* (2014.01)
*H04N 19/119* (2014.01)
(Continued)

(52) U.S. Cl.
CPC ......... *H04N 19/587* (2014.11); *H04N 19/119* (2014.11); *H04N 19/132* (2014.11);
(Continued)

(58) Field of Classification Search
CPC .... H04N 19/70; H04N 19/436; H04N 19/119; H04N 19/182; H04N 19/132;
(Continued)

(56) References Cited

U.S. PATENT DOCUMENTS 6,633,678 B2 10/2003 Boon
9,462,268 B2 10/2016 Rodriguez
(Continued)

FOREIGN PATENT DOCUMENTS

KR 20150122767 11/2015
KR 20170101983 9/2017
(Continued)

OTHER PUBLICATIONS

Bordes, Philippe, et al., AHGI8: Resolution Adaptation Coding (ARC) using single resolution in DPB, Joint Collaborative Team on Video Coding (JCT-VC) of ITU-T SGI6 WP3 and ISO/IEC JTC1SC29/WG11, JCTVC-H0321-1, 8th Meeting: San Jose, CA, USA, Jan. 2012 pp. 1-11.
(Continued)

*Primary Examiner* — Neil R Mikeska
(74) *Attorney, Agent, or Firm* — Sage Patent Group

(57) ABSTRACT

Video/picture coding of improved coding efficiency with supporting varying resolution and/or efficiently handling region-wise packing.

30 Claims, 35 Drawing Sheets

Related U.S. Application Data continuation of application No. 16/990,898, filed on Aug. 11, 2020, now Pat. No. 11,616,979, which is a continuation of application No. PCT/EP2019/053962, filed on Feb. 18, 2019.

(51) Int. Cl.
*H04N 19/132* (2014.01)
*H04N 19/172* (2014.01)
*H04N 19/423* (2014.01)
*H04N 19/70* (2014.01)

(52) U.S. Cl.
CPC ......... *H04N 19/172* (2014.11); *H04N 19/423* (2014.11); *H04N 19/70* (2014.11)

(58) Field of Classification Search
CPC .... H04N 19/587; H04N 19/59; H04N 19/176; H04N 19/114; H04N 19/124; H04N 19/172; H04N 19/423; H04N 19/42; H04N 19/46; H04N 19/33; H04N 19/61; H04N 19/91; H04N 19/43; H04N 19/105; H04N 19/553; H04N 19/577; H04N 19/136; H04N 19/90; H04N 19/17; H04N 19/186; H04N 19/503; H04N 19/146; H04N 19/00; H04N 19/20
See application file for complete search history.

(56) References Cited

U.S. PATENT DOCUMENTS

| | | | |
|---|---|---|---|
| 10,944,962 | B2 | 3/2021 | Kang |
| 2002/0071485 | A1 | 6/2002 | Caglar |
| 2007/0258702 | A1 | 11/2007 | Sugio |
| 2007/0280349 | A1 | 12/2007 | Prieto |
| 2008/0301317 | A1 | 12/2008 | Lee |
| 2009/0122865 | A1 | 5/2009 | Henocq |
| 2009/0141814 | A1 | 6/2009 | Yin |
| 2010/0118973 | A1 | 5/2010 | Rodriguez |
| 2010/0150232 | A1 | 6/2010 | Nguyen |
| 2011/0075734 | A1 | 3/2011 | Sakazume |
| 2013/0028314 | A1 | 1/2013 | Rodriguez |
| 2013/0089154 | A1 | 4/2013 | Chen et al. |
| 2013/0188738 | A1 | 7/2013 | Hannuksela |
| 2013/0208792 | A1 | 8/2013 | He |
| 2014/0016694 | A1 | 1/2014 | Boyce |
| 2014/0086333 | A1 | 3/2014 | Wang |
| 2014/0092978 | A1 | 4/2014 | Bugdayci |
| 2014/0294062 | A1 | 10/2014 | Chen et al. |
| 2014/0328400 | A1 | 11/2014 | Puri et al. |
| 2014/0362910 | A1 | 12/2014 | Seregin et al. |
| 2015/0103887 | A1 | 4/2015 | Ramasubramonian |
| 2015/0103928 | A1 | 4/2015 | Seregin |
| 2015/0124864 | A1 | 5/2015 | Kim |
| 2015/0195545 | A1 | 7/2015 | Wang |
| 2015/0195561 | A1 | 7/2015 | Wang |
| 2015/0264370 | A1 | 9/2015 | Ramasubramonian |
| 2015/0271526 | A1 | 9/2015 | Hendry |
| 2016/0295250 | A1 | 10/2016 | Yang |
| 2016/0330453 | A1 | 11/2016 | Zhang |
| 2017/0064313 | A1 | 3/2017 | Wu |
| 2020/0169751 | A1 | 5/2020 | Thomas |
| 2020/0374552 | A1 | 11/2020 | Skupin et al. |
| 2022/0385935 | A1 | 12/2022 | Lu et al. |
| 2023/0171425 | A1 | 6/2023 | Skupin et al. |

FOREIGN PATENT DOCUMENTS

| | | | |
|---|---|---|---|
| WO | 2017052250 | A1 | 3/2017 |
| WO | 2017108815 | A1 | 6/2017 |

OTHER PUBLICATIONS

Davies, Thomas, Resolution switching for coding efficiency and resilience, Joint Collaborative Team on Video Coding (JCT-VC) of ITU-T SG16 WP3 and ISO/IEC JTC1/SC29/WG11, JCTVC-F158, 6th Meeting: Turin, IT, Jul. 2011, pp. 1 to 11.

Misra, Kiran, et al., AHG18/21: Absolute signaling for resolution switching, Joint Collaborative Team on Video Coding (JCT-VC) of ITU-T SG16 WP3 and ISO/IEC JTC1/SC29/WG11, JCTVC-G715, 7th Meeting: Geneva, CH, Nov. 2011, pp. 1 to 5.

Tourapis, Alexis Michael, et al., Reduced Resolution Update Mode for Enhanced Compression, Joint Collaborative Team on Video Coding (JCT-VC) of ITU-T SG16 WP3 and ISO/IEC JTC1/SC29/WG11, JCTVC-H0447, $8^{th}$ Meeting: San Jose, CA, USA, Jan. 2012, pp. 1-4.

Seregin V. et al., "SHVC HLS: Earlier DPB clearing for adaptive resolution change", 14. JCT-VC Meeting, 25.07.2013-02.8.2013 Vienna, 2013.

Bordes P. et al., AHG18: Resolution Adaptation Coding (ARC) using single resolution in DPB, JCTVC-H321, Feb. 2012, Feb. 2012.

Misra K. et al., "AHG18/21: Absolute signaling for resolution switching", 7. JCT-VC Meeting, 98. MPEG Meeting, 21.11.2011-30.11.2011, Geneva, Nov. 2011.

Notice of Allowance mailed Oct. 3, 2022 in U.S. Appl. No. 16/990,898.

Advisory Action mailed Feb. 18, 2022 in U.S. Appl. No. 16/990,898.

Final Office Action mailed Oct. 2, 2021 in U.S. Appl. No. 16/990,898.

Office Action mailed Jul. 6, 2021 in U.S. Appl. No. 16/990,898.

ITU-T H.263 (Jan. 2005): Video coding for low bit rate communication, Annex O "Temporal, SNR and Spatial Scalabilit mode" and Annex P "Reference Picture Resampling".

106

| pic_parameter_set_rbsp( ) { | Descriptor |
|---|---|
| pps_pic_parameter_set_id | ue(v) |
| pps_seq_parameter_set_id | ue(v) |
| dependent_slice_segments_enabled_flag | u(1) |
| [ … ] | |
| pps_dynamic_resolution_enabled_flag | u(1) |
| if ( pps_dynamic_resolution_enabled_flag ) { | |
| pic_width_in_luma_samples | ue(v) |
| pic_height_in_luma_samples | ue(v) |
| } | |
| [ … ] | |
| } | |

112 101 110 104

Fig. 6

114

| seq_parameter_set_rbsp( ) { | Descriptor |
|---|---|
| sps_video_parameter_set_id | u(4) |
| sps_max_sub_layer_minus1 | u(3) |
| sps_temporal_nesting_flag | u(1) |
| [ … ] | |
| sps_seq_parameter_set_id | u(1) |
| sps_dynamic_resolution_enabled_flag | u(1) |
| [ … ] | |
| } | |

116

Fig. 7

114

| seq_parameter_set_rbsp( ) { | Descriptor |
|---|---|
| sps_video_parameter_set_id | u(4) |
| sps_max_sub_layer_minus1 | u(3) |
| sps_temporal_nesting_flag | u(1) |
| [ … ] | |
| 116 → dynamic_resolution_enabled_flag | u(1) |
| if ( dynamic_resolution_enabled_flag ) { | |
| num_pic_sizes_in_luma_samples_minus1 | ue(v) |
| for( i = 0; I <= num_pic_sizes_in_luma_samples_minus1; i++ ){ | |
| 108 → pic_width_in_luma_samples[i] | ue(v) |
| 110 → pic_height_in_luma_samples[i] | ue(v) |
| } | |
| } | |
| [ … ] | |
| } | |

118

Fig. 8

120

122

| slice_segment_header( ) { | Descriptor |
|---|---|
| first_slice_segment_in_pic_flag | u(1) |
| if( nal_unit_type >= BLA_W_LP && nal_unit_type <= RSV_IRAP_VCL23 ) | |
| no_output_of_prior_pics_flag | u(1) |
| slice_pic_parameter_set_id | ue(v) |
| if ( dynamic_resolution_enabled_flag ) | |
| pic_size_id_in_sh | u(v) |
| if( !first_slice_segment_in_pic_flag ) { | |
| if( dependent_slice_segments_enabled_flag ) | |
| dependent_slice_segment_flag | u(1) |
| slice_segment_address | u(v) |
| } | |
| if( !dependent_slice_segment_flag ) { | |
| for( i = 0; i < num_extra_slice_header_bits; i++ ) | |
| slice_reserved_flag[ i ] | u(1) |
| slice_type | ue(v) |
| [ ... ] | |
| } | |
| byte_alignment( ) | |
| } | |

Fig. 9

124

| vui_parameters( ) { | Descriptor |
| --- | --- |
| aspect_ratio_info_present_flag | u(1) |
| if ( aspect_ratio_info_present_flag ) { | |
| if ( dynamic_resolution_enabled_flag ) | |
| aspect_ratio_to_pic_size_idx | u(8) |
| aspect_ratio_idc | u(8) |
| if ( aspect_ratio_idc = = EXTENDED_SAR ) { | |
| 128 sar_width | u(16) |
| 130 sar_heigth | u(16) |
| } | |
| } | |
| [ ... ] | |
| } | |

126

Fig. 10

124

| vui_parameters( ) { | Descriptor |
|---|---|
| aspect_ratio_info_present_flag | u(1) |
| if ( aspect_ratio_info_present_flag ) { | |
| if ( dynamic_resolution_enabled_flag ) { | |
| for( i = 0; i <= num_pic_in_luma_samples_minus1; i++ ){ | |
| 132 → aspect_ratio_idc[i] | u(8) |
| if ( aspect_ratio_idc[i] = = EXTENDED_SAR ) { | |
| 128 → sar_width[i] | u(16) |
| 130 → sar_heigth[i] | u(16) |
| } | |
| | |
| }else{ | |
| aspect_ratio_idc | u(8) |
| if ( aspect_ratio_idc = = EXTENDED_SAR ) { | |
| sar_width | u(16) |
| sar_heigth | u(16) |
| } | |
| | |
| } | |
| [ … ] | |
| } | |

126

Fig. 11

124

| vui_parameters( ) { | Descriptor |
|---|---|
| aspect_ratio_info_present_flag | u(1) |
| if ( aspect_ratio_info_present_flag ) { | |
| if ( dynamic_resolution_enabled_flag ) { | |
| all_aspect_ratio_equal_flag | u(1) |
| if ( all_aspect_ratio_equal_flag ) { | |
| aspect_ratio_idc | u(8) |
| if ( aspect_ratio_idc = = EXTENDED_SAR ) { | |
| sar_width | u(16) |
| sar_heigth | u(16) |
| }else { | |
| num_aspect_ratio_formats_minus1 | ue(v) |
| for( i = 0; i <= num_aspect_ratio_formats_minus1; i++ ){ | |
| aspect_ratio_idc[i] | u(8) |
| if ( aspect_ratio_idc[i] = = EXTENDED_SAR ) { | |
| sar_width[i] | u(16) |
| sar_heigth[i] | u(16) |
| } | |
| } | |
| | |
| }else{ | |
| aspect_ratio_idc | u(8) |
| if ( aspect_ratio_idc = = EXTENDED_SAR ) { | |
| sar_width | u(16) |
| sar_heigth | u(16) |
| } | |
| } | |
| } | |
| [ … ] | |
| } | |

134 — all_aspect_ratio_equal_flag
136 — num_aspect_ratio_formats_minus1
126 — aspect_ratio_idc … sar_heigth
126 — aspect_ratio_idc[i] … sar_heigth[i]

Fig. 12

| seq_parameter_set_rbsp( ) { | Descriptor |
|---|---|
| sps_video_parameter_set_id | u(4) |
| sps_max_sub_layer_minus1 | u(3) |
| sps_temporal_nesting_flag | u(1) |
| [ … ] | |
| 254 → mixed_resolution_enabled_flag | u(1) |
| if ( mixed_resolution_enabled_flag ) { | |
| 256 → num_resolution_areas_minus1 | ue(v) |
| for( i = 0; i <= num_resolution_areas_minus1; i++ ) { | |
| log2_min_luma_coding_block_size_minus3[i] | ue(v) |
| log2_diff_max_min_luma_coding_block_size[i] | ue(v) |
| log2_min_luma_transform_block_size_minus2[i] | ue(v) |
| log2_diff_max_min_luma_transform_block_size[i] | ue(v) |
| max_transform_hierarchy_intra[i] | ue(v) |
| max_transform_hierarchy_inter[i] | ue(v) |
| } | |
| } | |
| [ … ] | |
| } | |

250 (rows log2_min_luma_coding_block_size_minus3[i] to max_transform_hierarchy_inter[i])

Fig. 18

<table>
<tr><th>coding_quadtree( x0, y0, log2CbSize, cqtDepth) {</th><th>Descriptor</th></tr>
<tr><td>if( ! (TileId(x0, y0 ) = = TileId( x0 + ( 1<<log2CbSize ), y0+( 1<<log 2CbSize )))<br>|| ( x0 + ( 1 << log2CbSize ) <= pic_width_in_luma_samples && y0 + ( 1 <<<br>log2CbSize ) <= pic_height_in_luma_samples ) ) && log2CbSize><br>MinCbLog2SizeY )</td><td>251a</td></tr>
<tr><td>split_cu_flag[ x0 ][ y0]</td><td>ae(v)</td></tr>
<tr><td>if( cu_qp_delta_enabled_flag && log2CbSize >= Log2MinCuQpDeltaSize ) {</td><td></td></tr>
<tr><td>IsCuQpDeltaCoded = 0</td><td></td></tr>
<tr><td>CuQpDeltaVal = 0</td><td></td></tr>
<tr><td>}</td><td></td></tr>
<tr><td>if( cu_chroma_qp_offset_enabled_flag && log2CbSize >=</td><td></td></tr>
<tr><td>Log2MinCuChromaQpOffsetSize )</td><td></td></tr>
<tr><td>IsCuChromaQpOffsetCoded = 0</td><td></td></tr>
<tr><td>if( split_cu_flag[ x0 ][ y0] ) {</td><td></td></tr>
<tr><td>x1 = x0 + ( 1 << ( log2CbSize - 1 ) )</td><td></td></tr>
<tr><td>y1 = y0 + ( 1 << ( log2CbSize - 1 ) )</td><td></td></tr>
</table>

Fig. 19c

```
        coding_quadtree( x0, y0, log2CbSize - 1, cqtDepth + 1)
          if( x1 < pic_width_in_luma_samples || ((TileId(x0,y0) = = TileId(x0 + ( 1 <<
            log2CbSize ), y0)) )
            coding_quadtree( x1, y0, log2CbSize - 1, cqtDepth + 1 )
          if( y1 < pic_height_in_luma_samples ) || ((TileId(x0,y0) = = TileId(x0, y0 + ( 1 <<
            log2CbSize ))))
            coding_quadtree( x0, y1, log2CbSize - 1, cqtDepth + 1)
          if( x1 < pic_width_in_luma_samples && y1 < pic_height_in_luma_samples ||
            ((TileId(x0,y0) = = TileId(x0 + ( 1<< log2CbSize ), y0 + (1<<log2CbSize ))))
            coding_quadtree( x1, y1, log2CbSize - 1, cqtDepth + 1 )
    } else
        coding_unit( x0, y0, log2CbSize)
}
```

251b

251b

251b

Fig. 19c (cont.)

| seq_parameter_set_rbsp( ) { | Descriptor |
|---|---|
| sps_video_parameter_set_id | u(4) |
| sps_max_sub_layer_minus1 | u(3) |
| sps_temporal_nesting_flag | u(2) |
| [ … ] | |
| mixed_resolution_enabled_flag | u(1) |
| if ( mixed_resolution_enabled_flag ) { | |
| num_resolution_areas_minus1 | ue(v) |
| for(i = 0; i < = num_resolution_areas_minus1; i + + ){ | |
| scaling_list_data( )[i] | |
| } | |
| } | |
| [ … ] | |
| } | |

360

| pic_parameter_set_rbsp( ) { | Descriptor |
|---|---|
| pps_pic_parameter_set_id | u(4) |
| [ ... ] | |
| region_resample_enabled_flag | u(1) |
| if ( region_resample_enabled_flag ) { | |
| num_resample_regions_minus1 | ue(v) |
| for(i = 0; i <= num_resample_regions_minus1; i++ ){ | |
| resample_idc[i] | u(4) |
| } | |
| [ ... ] | |
| } | |

Fig. 27

| residual_coding( x0, y0, log2TrafoSize, cIdx ) { | Descriptor |
|---|---|
| [ … ] | |
| res_subsampled_flag | u(1) |
| [ … ] | |
| } | |

Fig. 29

| coding_unit( x0, y0, log2CbSize ) { | Descriptor |
|---|---|
| [ … ] | |
| res_subsampled_flag | u(1) |
| [ … ] | |
| } | |

Fig. 30

| seq_parameter_set_rbsp( ) { | Descriptor |
|---|---|
| sps_video_parameter_set_id | u(4) |
| sps_max_sub_layer_minus1 | u(3) |
| sps_temporal_nesting_flag | u(1) |
| [ ... ] | |
| mixed_resolution_enabled_flag | u(1) |
| log2_min_luma_coding_block_size_minus3 | ue(v) |
| log2_diff_max_min_luma_coding_block_size | ue(v) |
| log2_min_luma_transform_block_size_minus2 | ue(v) |
| log2_diff_max_min_luma_transform_block_size | ue(v) |
| max_transform_hierarchy_intra | ue(v) |
| max_transform_hierarchy_inter | ue(v) |
| if ( mixed_resolution_enabled_flag ) { | |
| log2_min_res_subsampled_flag_present_block_size_minus3 | ue(v) |
| log2_diff_max_min_res_subsampled_flag_present_block_size | ue(v) |
| } | |
| [ ... ] | |
| } | |

Fig. 31

| coding_unit( x0, y0, log2CbSize ) { | Descriptor |
|---|---|
| [ ... ] | |
| if ( mixed_resolution_enabled_flag && ctuSizeWithinRange ) | |
| res_subsampled_flag | u(1) |
| [ ... ] | |
| } | |

Fig. 32

| seq_parameter_set_rbsp( ) { | Descriptor |
|---|---|
| sps_video_parameter_set_id | u(4) |
| sps_max_sub_layer_minus1 | u(3) |
| sps_temporal_nesting_flag | u(1) |
| [ ... ] | |
| mixed_resolution_enabled_flag | u(1) |
| log2_min_luma_coding_block_size_minus3 | ue(v) |
| log2_diff_max_min_luma_coding_block_size | ue(v) |
| log2_min_luma_transform_block_size_minus2 | ue(v) |
| log2_diff_max_min_luma_transform_block_size | ue(v) |
| max_transform_hierarchy_intra | ue(v) |
| max_transform_hierarchy_inter | ue(v) |
| if ( mixed_resolution_enabled_flag ) { | |
| delta_qp_for_subsampled_blocks | ue(v) |
| } | |
| [ ... ] | |
| } | |

Fig. 33

PICTURE/VIDEO CODING SUPPORTING VARYING RESOLUTION AND/OR EFFICIENTLY HANDLING REGION-WISE PACKING

CROSS-REFERENCES TO RELATED APPLICATIONS

This application is a continuation of U.S. patent application Ser. No. 18/090,340, filed Dec. 28, 2022, which is a continuation of U.S. patent application Ser. No. 16/990,898 filed Aug. 11, 2020 (U.S. patent Ser. No. 11/616,979 issued Mar. 28, 2023), which is a continuation of PCT International Patent Application No. PCT/EP2019/053962, filed Feb. 18, 2019, which claims priority from European Patent Application No. 18157718.0, filed Feb. 20, 2018, the entire contents of each of which are hereby incorporated by reference in this application.

The present application concerns video/picture coding of improved coding efficiency with supporting varying resolution and/or efficiently handling region-wise packing.

BACKGROUND OF THE INVENTION

The single layer base version of HEVC does not allow for picture resolution to change within a coded video sequence. It is only at random access points RAP (e.g. at IDR RAPs that reset the decoded picture buffer entirely), where resolution changes may occur with a start of a new coded video sequence which includes flushing the decoded picture buffer (DPB). Flushing the DPB, however, reduces the achievable coding efficiency significantly owing to the fact that the exploitation of previously coded references is disrupted.

Accordingly, there is a need for an improved video/picture codec which is able to more efficiently exploit resolution variation in order to improve the coding efficiency.

There also exist tools enabling carrying a scene such as a panoramic scene or the like, by way of a coded picture or coded video, called region-wise packing, where the picture/video codec is oblivious to the way this scene is, in a region-wise manner, mapped onto the picture/pictures. The mapping is just a pre-processing at the side of the encoder, and a post-processing at the side of the decoder, while the codec operates on the packed picture/pictures without awareness of the region-wise packing. MPEG OMAF, for instance, provides a framework for such conveyance of a scene by way of packed picture/pictures. The scene partitioning/mapping defining the partitioning of the coded picture/pictures into picture regions each being mapped onto a respective scene region of the scene, is signaled as side information by way of SEI messages, for instance, to control the post processing at the side of the decoder in order to re-map the coded picture/pictures onto the scene domain. While such a solution is efficient in terms of re-usage of existing coding tools, namely existing picture/video codecs, it would be favorable to have a concept at hand allowing region-wise packing to be handled more efficiently.

SUMMARY

One embodiment may have a video encoder configured to receive a source video, encode the source video at a target spatial resolution into a data stream, wherein the video encoder supports a variation of the target spatial resolution at a temporal scale finer than a random access distance at which the source video is encoded into the data stream.

Another embodiment may have a video decoder configured to decode a video from a data stream, wherein the video decoder is configured to derive from the data stream a variation of a target spatial resolution at which the video is encoded into the data stream at a temporal scale finer than a random access distance at which the video is encoded into the data stream.

According to another embodiment, a method for video encoding may have the steps of: receiving a source video, encoding the source video at a target spatial resolution into a data stream, wherein target spatial resolution is varied at a temporal scale finer than a random access distance at which the source video is encoded into the data stream.

According to yet another embodiment, a method for video decoding may have the steps of: decoding a video from a data stream, deriving from the data stream a variation of a target spatial resolution at which the video is encoded into the data stream at a temporal scale finer than a random access distance at which the video is encoded into the data stream.

According to yet another embodiment, a non-transitory digital storage medium may have a computer program stored thereon to perform the inventive methods, when said computer program is run by a computer.

Yet another embodiment may have a data stream generated by the inventive method for video encoding.

In accordance with a first aspect of the present application, a more efficient video codec is achieved by supporting a variation of the target spatial resolution at which a video is coded into a data stream, at a temporal scale finer than a random access distance at which the video encoding is performed. The temporal variation of the target spatial resolution may be controlled as part of the rate control of the video encoder. As the variation of the target spatial resolution is done at a temporal scale finer than the random access distance, coding efficiency may be increased by allowing the encoder to adapt the target spatial resolution to the current video coding complexity. Different possibilities exist with respect to varying the target spatial resolution, i.e., the number of samples per mutually corresponding picture content in the pictures of the video. For instance, video encoder and video decoder may use a prediction loop into which a DPB is connected serially, wherein the already processed pictures are buffered in the DPB at the varying target spatial resolution. In that case, resampling of pictures in the DPB may be done on the fly in case of target spatial resolution difference between referenced and referencing picture which references the referenced picture, the resampling yielding a motion-compensated predictor. Alternatively, the prediction loop may be fed by pictures at a reference spatial resolution, i.e., some fixed spatial resolution which may be greater than any other possible value the target spatial resolution may assume. In such a case, resampling may be done in order to bridge the gap between target spatial resolution and reference spatial resolution. For instance, prediction residual coding is done at the target spatial resolution with performing re-sampling of the prediction residual towards the reference spatial resolution in order to perform the prediction correction of a predictor obtained from a picture in the DPB in the reference spatial resolution rather than target spatial resolution. Alternatively, resampling of the predictor obtained from a picture in the DPB towards the target spatial resolution may be performed in order to perform prediction correction at the target spatial resolution. Switching between these options may be supported by encoder and decoder, respectively. The variation of the target spatial resolution may be done at picture level, i.e., for each picture the target spatial resolution may be set by the encoder and signaled to the decoder in the data stream. In accordance with an embodiment, the signaling overhead associated with the continuous change in target spatial resolution and, associated therewith, picture size is alleviated by partitioning the pictures of the video according to changes in the target spatial resolution in a default manner such as, for instance, in such a manner that the partitioning is proportionally constant, i.e., the pictures are, despite their varying size, mutually proportional to each other, i.e., the partitionings coincide when scaled to equal spatial resolution. In accordance with even further embodiments, the latter relative scaling of the partitioning may be offered as one option in the data stream with the other option involving signaling the partitioning at a predetermined temporal scale finer than, or equal to, the temporal scale at which the target spatial resolution varies. The partitioning just-mentioned may be used to encode the video such as one leading to blocks in units of which the selection between inter and intra prediction mode is performed, as one leading to units of which 0 prediction parameters for inter-predicted blocks and intra-predicted blocks is performed or as one leading to units of which the prediction residual is subject to transformation or inverse transformation at encoder and decoder, respectively, or as one leading to units of which the pictures are sub-divided into tiles which are coded/decoded independently from each other, i.e., without intra-picture coding interdependencies.

In accordance with a further aspect of the present application, a video codec involves coding/decoding pictures of a video which are, according to a scene partitioning, partitioned into picture regions each having mapped there onto a respective scene region of a scene, in a manner dependent on this scene partitioning. The video encoder supports an adjustment of the scene partitioning such as, for instance, as a sort of user setting or the like, and signals this scene partitioning in the data stream from which the video decoder derives the same. By rendering the coding/decoding of the video in the data stream dependent on the scene partitioning, the scene partitioning is not just a pre/post processing relative to the video codec, but enables to achieve a coding efficiency increase by taking into account the scene partitioning which defines the partitioning into the picture regions as well as their mapping onto the scene regions. For example, instead of signaling the scene partitioning as side information in addition to the coding of packed pictures, i.e., the pictures being partitioned into the picture regions, the scene partitioning signaling may be used so as to, at least partially, save signaling overhead which would be redundant to the scene partitioning. For instance, coding the packed pictures may involve a coding partitioning into blocks in units of which the packed pictures are coded, such as coding units in units of which the inter or intra prediction decision is made, prediction units in units of which corresponding prediction parameters for the aforementioned blocks is made and/or transform units and in units of which the prediction residual is transform coded and/or tiles in units of which the packed pictures are coded in a manner mutually independent from each other. Split decisions associated with multi-tree subdivisioning involved in the coding partitioning may be, for instance, inferred on the basis of the scene partitioning, thereby saving signaling overhead. Alternatively, the video encoder may simply obey restrictions in the coding partitioning relative to the scene partitioning. Even further, some coding/decoding tools of video encoder and video decoder may be operated dependent on this scene partitioning. For instance, derivations of predictors may be performed dependent on the scene partitioning. The scene partitioning may result in picture regions within one picture which differs in scene sampling resolution, i.e., the number of samples per unit area or unit viewing angle of the scene or, differently speaking, in ratio between picture region size measured, for instance, in number of samples, relative to corresponding scene region size measured, for instance, as a fraction of the whole scene. Such scene sampling resolution variances may be taken into account by video encoder and video decoder in performing motion compensated prediction. For instance, the predictor May be determined in a manner dependent on scene sampling resolution difference between the picture region the inter-predicted block is located in, and the picture region of the reference picture pointed to by the motion vector of respective inter-predicted block. Even further, motion vector prediction may be performed in a manner taking into account scene sampling resolution differences. For instance, motion vector candidates may be derived based on motion vectors of neighboring blocks via modification: instead of directly adopting such a motion vector of a neighboring block, this motion vector may be copied in a manner so that a version of this motion vector having its initial point set to a reference point of the neighboring block and another version of this motion vector having its initial point set to a reference point of the inter-predicted block have terminal points the images of which in the scene, via the scene partitioning, have the same distance to one another than the images of the reference points of the neighboring block and the inter-predicted block in the scene. Motion vector prediction is, accordingly, done via a detour over the scene domain, thereby being sensitive to the scene partitioning.

Further, the coding/decoding of the video could be sensitive to the scene partitioning in terms of setting one or more parameters relating to the coding partitioning. For instance, such a parameter could be set and signaled in the data stream individually for the picture regions. Alternatively or additionally, filtering of a predetermined picture of the video could be done using a filter at least one parameter of which is varied across the predetermined picture depending on the scene partitioning. For instance, the at least one parameter could be set at interfaces between neighboring picture regions depending on a difference in scene sampling resolution between the neighboring/adjoining picture regions. By this manner, the filter characteristic could more precisely operate by taking into account the scene sampling resolution. Even further, video encoder and video decoder could locate, on the basis of the scene partitioning, interfaces between picture regions which do not abut each other in the scene, i.e., scene-discontinuous interfaces. Encoding and decoding could be sensitive to these scene-discontinuous interfaces. That is, the encoder could, for instance, treat these scene-discontinuous interfaces like picture borders, for instance. Decoder and encoder could perform filtering differently at such scene-discontinuous interfaces compared to interfaces between picture regions which abut each other in the scene. Even alternatively, picture region-wise signalization of the at least one parameter may be supported. Alternatively or additionally, a quantization parameter controlling a spectral shape of a spatial frequency spectrum of a quantization noise may be allowed to be set picture region-wise specifically or in units of groups of one or more picture regions. The variation may be signaled in the data stream.

The latter aspect, namely the variation of at least one quantization parameter controlling a spectral shape of a spatial frequency spectrum of a quantization noise of the quantization, may, in accordance with a further aspect of the present application, be used irrespective using scene partitioning or not. The coding efficiency may be increased by adapting the quantization parameter to the local characteristics of the picture especially when having a locally or spatially varying resolution.

In accordance with an even further aspect of the present application, coding efficiency increase is achieved by having a video codec allowing a target spatial resolution at which a video is coded in a data stream, to be varied in units of picture regions of pictures smaller than the pictures with signaling the variation in the data stream. This aspect may be combined with a first aspect discussed above and with the third aspect, i.e. the quantization parameter variation. The prediction loop may, for instance, be fed with pictures in a reference spatial resolution. Again, the variation of the target spatial resolution within the pictures may be a task performed by a rate control of the encoder.

BRIEF DESCRIPTION OF THE DRAWINGS

Embodiments of the present invention will be detailed subsequently referring to the appended drawings, in which:

FIG. 6 shows a possible syntax for signaling the varying target spatial resolution;

FIG. 7 shows an example for a SPS syntax including a flag switching on and off the possibility of varying the target spatial resolution;

FIG. 8 shows a syntax example for SPS for transmitting different target spatial resolution settings at a larger scale such as for a sequence of pictures, allowing the pictures to refer to any of these settings in the data stream by indexing;

FIG. 9 shows an example for a slice segment header syntax referring by an index syntax element to predefined target spatial resolution settings such as the ones signaled in FIG. 8:

FIG. 10 shows a syntax example for signaling the output aspect ratio for one resolution such as the reference spatial resolution or one of the target spatial resolutions;

FIG. 11 shows an example for a syntax for transmitting the output aspect ratio for all possible target spatial resolution settings;

FIG. 12 shows an alternative syntax where a number of different output aspect ratio settings may be signaled, with a number being equal to or larger than the number of possible target spatial resolution settings;

FIG. 18 shows an example for a syntax for conveying the coding partition parameterization of FIG. 17 in the data stream, here exemplarily the SPS;

FIG. 19*c* shows a syntax example for a CU splitting syntax for splitting blocks partially extending from an own RWP region into a neighboring on while avoiding signaling split indicators for split decisions redundant or otherwise inferable by inspecting the location of the regions subject to the respective split with respect to the border between the current RWP region and the neighboring RWP region;

FIG. 27 shows an example syntax of signaling the varying target spatial resolution.

FIG. 29 shows a syntax example for illustrating that the spatial variance of the target spatial resolution within a certain picture in accordance with the examples of FIGS. 26 to 28, may be done using a syntax element or a resampling indicator or some other indicator indicating a certain target spatial resolution value per block the respective picture is partitioned into;

FIG. 30 shows a syntax example differing from FIG. 29 in that the transmission of the syntax element takes place at coding unit level, i.e., for blocks for which the prediction mode decision takes places, rather than for transform blocks which example FIG. 20 refers to;

FIG. 31 shows a syntax example for an SPS which indicates the possibility of restricting the transmission of syntax elements depicted in FIGS. 29 and 30 to blocks within a certain predefined block size range, with inferring that for blocks outside that ranges a reference spatial resolution shall be used for encoding/decoding;

FIG. 32 shows a syntax example differing from FIG. 29 in that the transmission of the syntax element is restricted to a range of predetermined block sizes; and FIG. 33 shows a syntax example for an SPS signaling a quantization step size offset to be used for resampled blocks of a picture, i.e., blocks not coded/decoded in a reference spatial resolution.

DETAILED DESCRIPTION OF THE INVENTION

The description starts with embodiments relating to a first aspect of the present application. Later on, several further aspects are described. It should be noted that aspects of the present application may be combined as will be outlined in more detail below.

The first aspect of the present application relates to the dynamic variation of the target spatial resolution at a temporal scale finer than a random access pitch or distance at which video coding is done. Later on, further aspects of the present application are described and it should be noted that these aspects of the present application may be used together in order to form further embodiments beyond those discussed herein wherein such combinations are also mentioned hereinafter.

For instance, embodiments of the present application relating to the first aspect may enable a hybrid block based motion-compensated video encoder to dynamically change spatial resolution measured, for instance, as the amount of samples per depicted viewing angle of a picture, the change being relative to, for instance, an input spatial resolution. The coded takes advantage of this fact in terms of coding efficiency. Later on, there are also embodiments and aspects discussed where such a hybrid block based motion-compensated video encoder is given the opportunity to dynamically change spatial resolution also with respect to picture subsections.

So far, signaling needs of such a codec system remain unsolved. The single layer base version of HEVC, for instance, does not allow for the picture resolution to change within a coded video sequence. It is only at random access points without leading pictures, i.e., at IDR RAPs that reset the decoded picture buffer entirely, where resolution changes may occur with a start of a new coded video sequence which includes flushing of the decoded picture buffer. However, scenarios exist where resolution change is desirable to have at different positions in bitstream than IDR/BLA based RAP. First, open GOP coding structures use RAP types with higher coding efficiency, i.e., involve leading pictures that follow the RAP in bitstream order, but use reference pictures that precede the RAP. The RAP is, here, for instance a CRA picture. A resampling of the pre-RAP reference pictures would be useful which, however, is not foreseen in codecs known so far. Beyond this, RAP rate should be kept beyond a certain limit in order to avoid coding efficiency decrease owing to the prediction reservoir loss associated with such RAPs. It may, thus, be desirable to change the spatial resolution within a coded video sequence even without the occurrence of RAP such as within the highest temporal layer of a hierarchal GOP or any other subset of coded pictures.

Figure 1A:
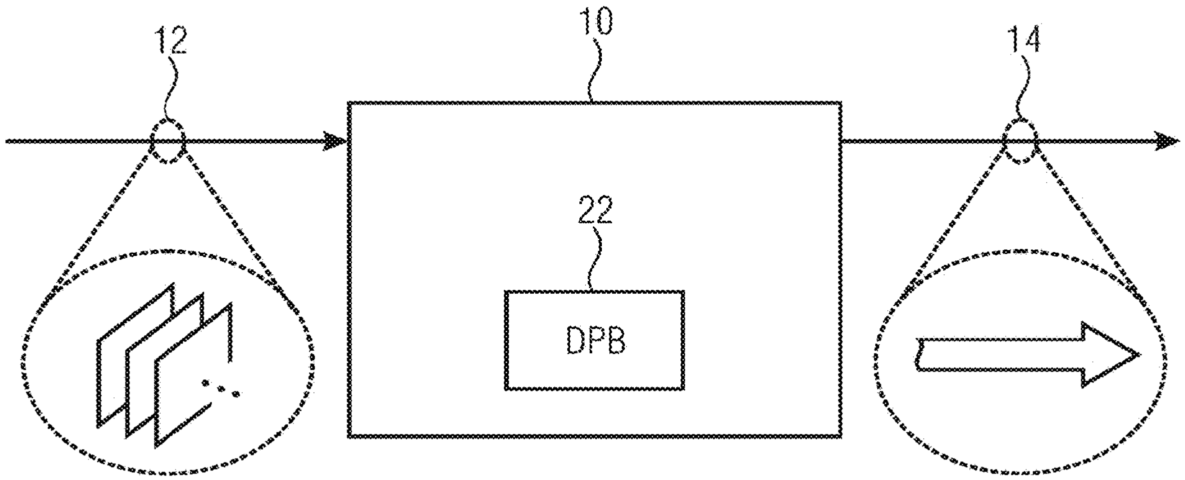
FIG. 1*a* shows a schematic block diagram of a video encoder in accordance with an embodiment using video encoding dependent on a temporal variation of the target spatial resolution.

The embodiments described herein allow for resolution change in a coded video sequence at a temporal scale finer than random access pitch/distance. There are, for example, three variants imaginable for implementing such a mid-CVS resolution change. Here, a reference spatial resolution may define, for instance, a highest spatial resolution such as a maximum of the target spatial resolution at which a video is coded in the data stream. Before discussing same, however, the general structure of encoder and decoder is described with respect to FIGS. 1*a* and 1*b*. FIG. 1*a* shows a video encoder 10 which receives a source video 12 and encodes the source video 12 at a target spatial resolution into a data stream 14 in a manner so that the target spatial resolution varies at a temporal scale finer than a random access distance at which the source video is encoded into the data stream 14. FIG. 2*a*, for instance, shows a subsequence of pictures out of video 12, here exemplarily three pictures 161, 162 and 163. All of these pictures show the same scene 18 and, for instance, coincide in the field of view of scene 18 indicated by the rectangle 20 surrounding scene 18. That is, pictures 161 to 16, of video 12 may coincide in the scene section depicted in these pictures. However, as illustrated by dots within picture 161 to 163 within FIG. 2*a*, which shall represent a sort of spatial sampling of the respective pictures 161 to 163, the pictures of video 12 are coded into data stream 14 by encoder 10 at varying target spatial resolution, i.e., at a varying number of samples per scene section or region 20 or, differently speaking, at different a number of samples per unit area of scene 18 such as unit viewing angle, for instance. The following description of various implementation variants will reveal as to what the "variation of the target spatial resolution" may refer to. In particular, the target spatial resolution varied may pertain to the prediction residual at which the video 12 is coded into data stream 14. That is, encoder 10 may be a predictive coder such as a hybrid video coder supporting inter and intra prediction modes, for instance, and the target spatial resolution variation may refer to the resolution at which the prediction residual in coded into a data stream 14. That is, while the source video 12 has a certain spatial resolution or, to be more precise, its pictures at the time of entering encoder 10, the situation during coding at which encoder performs the transition from the input resolution to the target spatial resolution may depend on the implementation chosen. In particular, as will be outlined in more detail below, the re-sampling may be done as an initial process right in front of all other coding tasks of encoder 10 which, accordingly, all operate at this target spatial resolution. These tasks may, for instance, include the prediction as well as the residual coding. The decoded picture buffer of encoder 10 exemplarily indicated at 22 in FIG. 1*a* would, thus, buffer the pictures 161 to 163 of video 12 at the varying target spatial resolution. This variant is called variant a in the following. Alternatively, the decoded picture buffer 22 may buffer the pictures of video 12 at a reference spatial resolution, i.e., some fixed spatial resolution, such as the input resolution of video 12, with a transition between target spatial resolution at which the residual coding is performed, and the reference spatial resolution being done with respect to the prediction signal or the residual signal, respectively, with these variants being called b and c in the following.

Figure 1B:
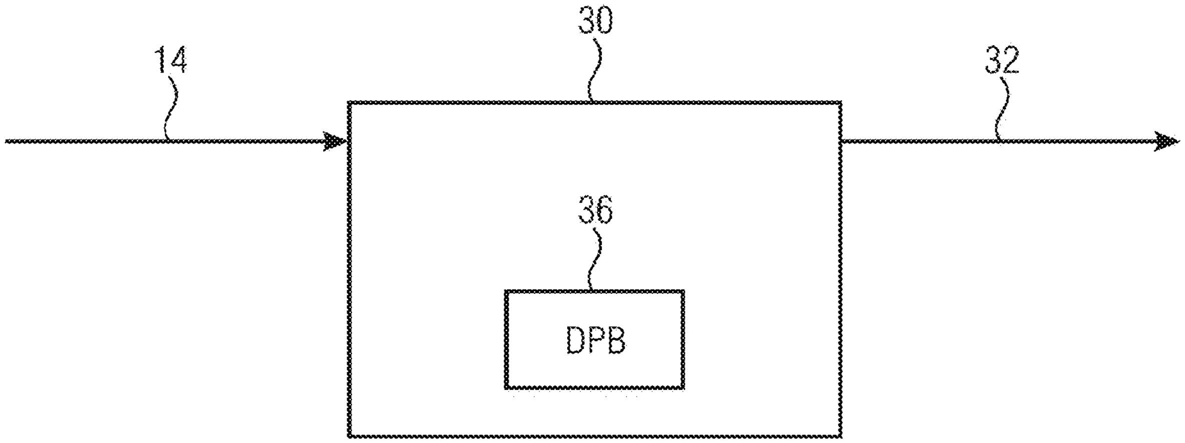
FIG. 1*b* shows a block diagram of a decoder fitting to the video encoder according to FIG. 1*a* in accordance with an embodiment.
Figure 2A:
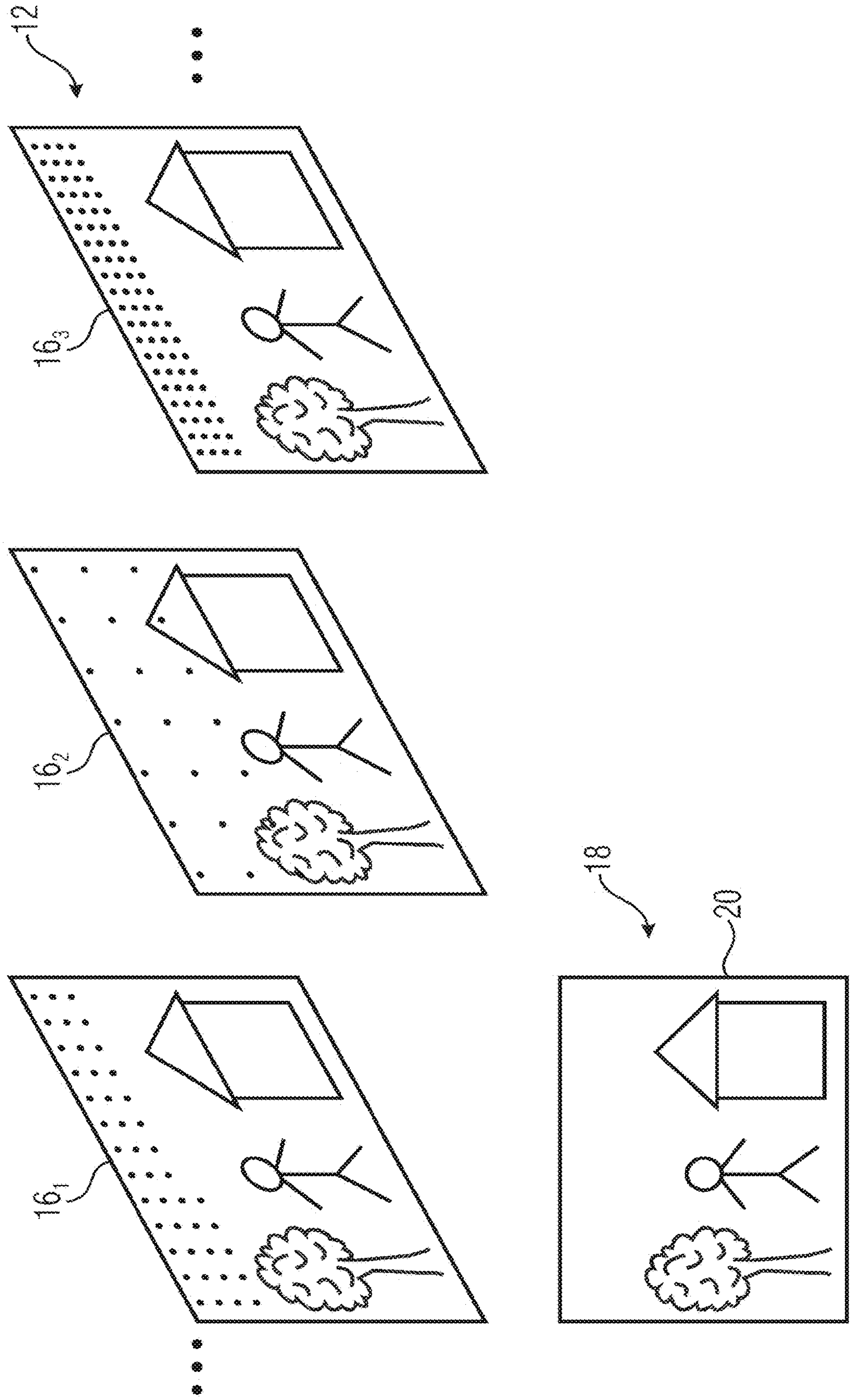
FIG. 2*a* shows a schematic diagram illustrating the target spatial resolution variances in accordance with the embodiments of FIGS. 1*a* and 1*b;*
Figure 2B:
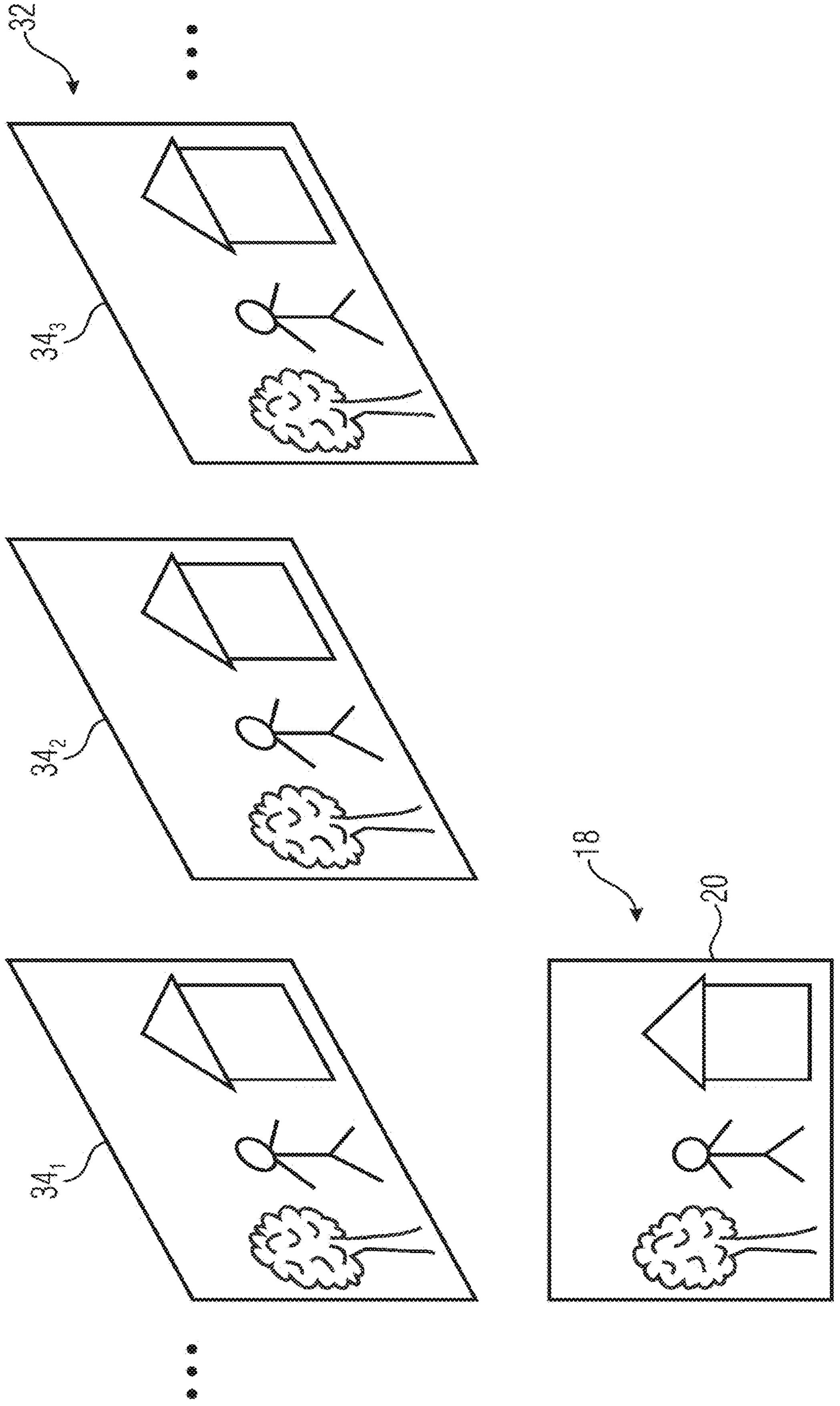
FIG. 2*b* shows a schematic diagram of the reconstructed video output by the video decoder of FIG. 1*b;*

FIG. 1*b* shows a video decoder fitting to the encoder of FIG. 1*a*. The video decoder of FIG. 1*b* is generally indicated using reference sign 30 and is configured to decode a video 32, namely a reconstruction of video 12, from data stream 14. The video decoder is configured to derive from the data stream 14 the variation of the target spatial resolution at which the video 32 is encoded into data stream 14, the variation being defined at a temporal scale finer than the random access distance at which the video 32 is encoded into data stream 14. See FIG. 2*b* which shows the reconstructed or decoded video 32 and its pictures 341 to 343 in a manner corresponding to the way FIG. 2*a* showed in resampling of the source video 12 entering encoder 10 internally in the encoder 10 for sake of encoding. Pictures 341 to 343 all show or represent scene 18 and may, for instance, all have this same scene section encoded thereinto. Depending on the implementation for which examples are described in more detail below, the sample resolution of pictures 341 to 343 output by decoder 30 may coincide with the target spatial resolution exemplarily illustrated in FIG. 2*a*, or may be constant in time and correspond to, for instance, the aforementioned reference sample resolution at which these pictures are buffered in a decoded picture buffer 36 of decoder 30 just as they were in DPB 22 of encoder 10. These examples will become clear from the following description of certain variants for implementing encoder and decoder, respectively.

Figure 3:
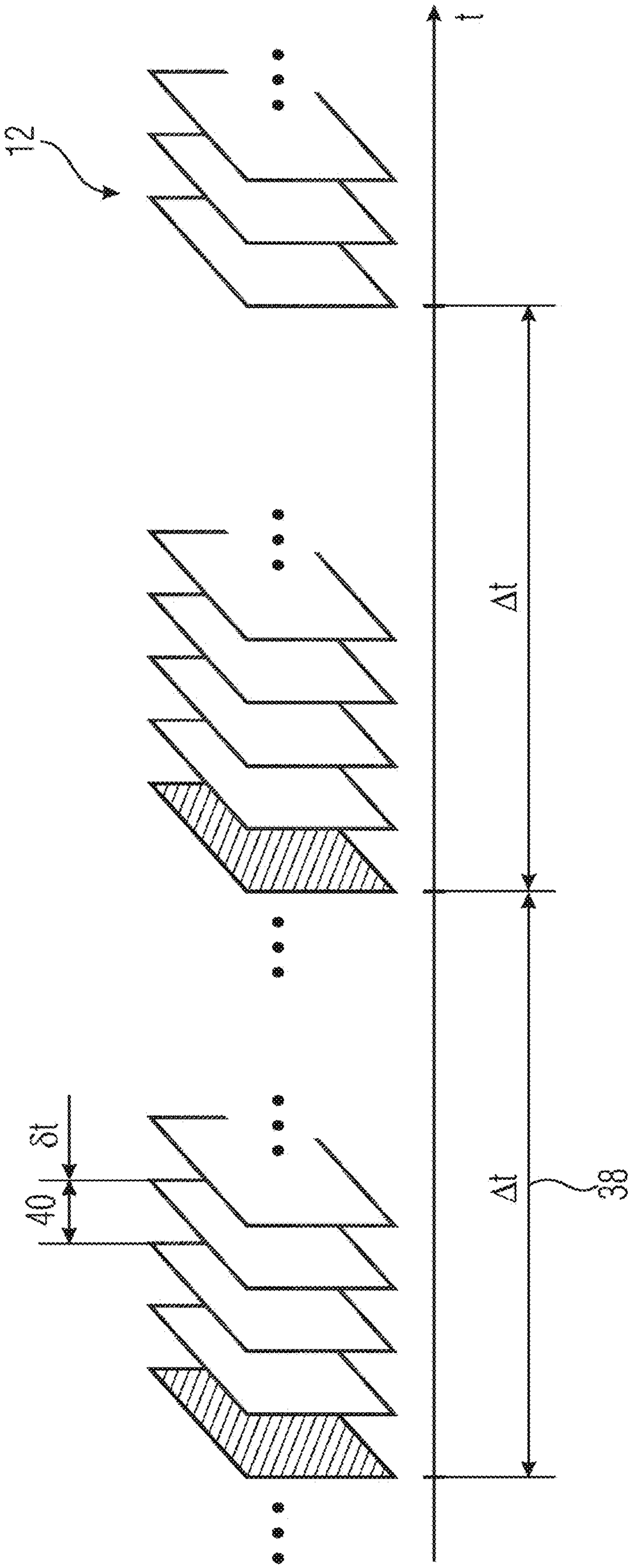
FIG. 3 shows a schematic diagram of the coded video in order to illustrate the temporal scale at which the target spatial resolution varies compared to the random access distance/pitch.

As described so far, the variation of the target spatial resolution takes place at a temporal scale finer than a random access distance/pitch at which the video coding is performed. As will be outlined in more detail below, and as it is illustrated in FIG. 2*a*, the temporal scale at which the target spatial resolution varies may, for instance, be a picture-wise variation. That is, the target spatial resolution may vary in units of pictures. The encoder 10 would, thus, be able to decide on a picture-by-picture basis as how to set the target spatial resolution with signaling the variation of the target spatial resolution at picture level. This is, however, not the only possibility. FIG. 3 shows a temporal axis t and illustrates pictures of video 12 at random access points using hatching. They occur at some temporal distance Δt which may be constant as illustrated in FIG. 3 or may vary in time in which case the random access distance may, for instance, denote the mean distance between the random access point picture of video 12. The temporal scale at which the target spatial resolution takes place denotes the minimum time duration between which the target spatial resolution may change. Accordingly, according to the examples of FIG. 1*a* and FIG. 1*b*, the random access distance Δt, 38 is larger than the minimum time distance δt, 40, at which the target spatial resolution may change. FIG. 3 illustrates the case that a target spatial resolution may change from one picture of video 12 to another.

Figure 4A:
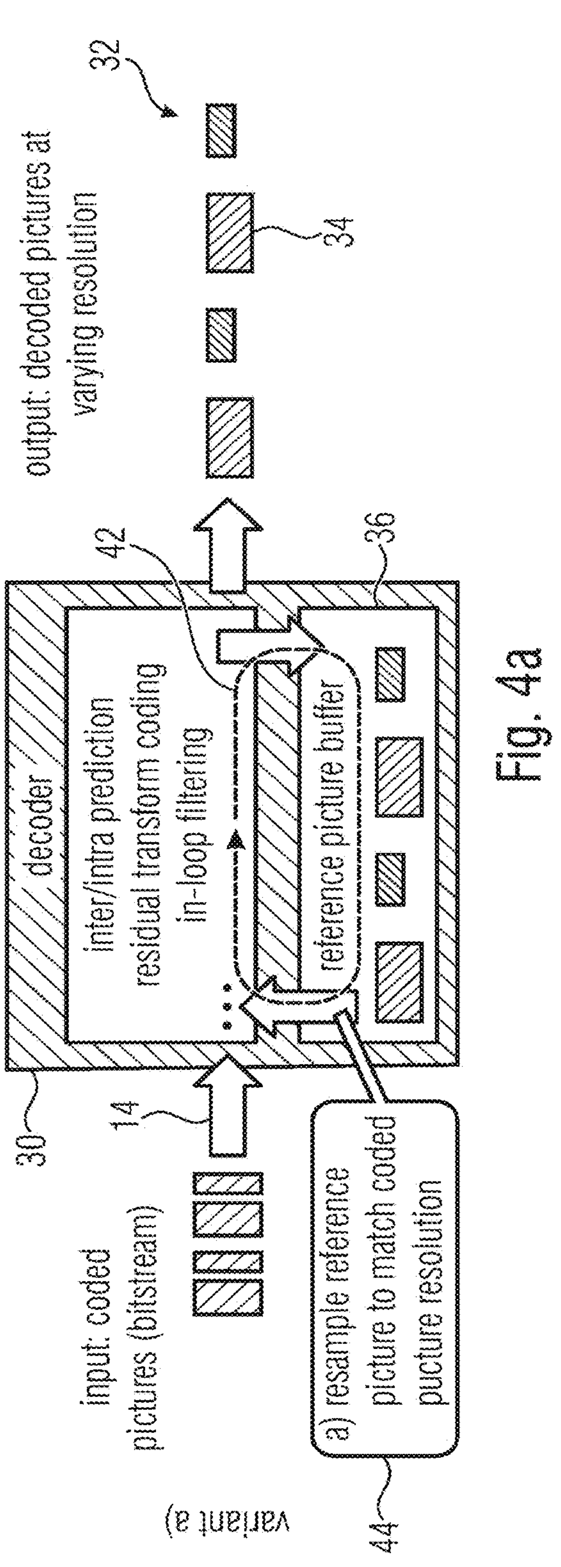
FIGS. 4*a* and 4*b* show schematic diagrams of a decoder operating according to different variants at which the decoder of FIG. 1*b* may operate the variants differing in the resolution at which pictures are buffered in the DPB.
Figure 4B:
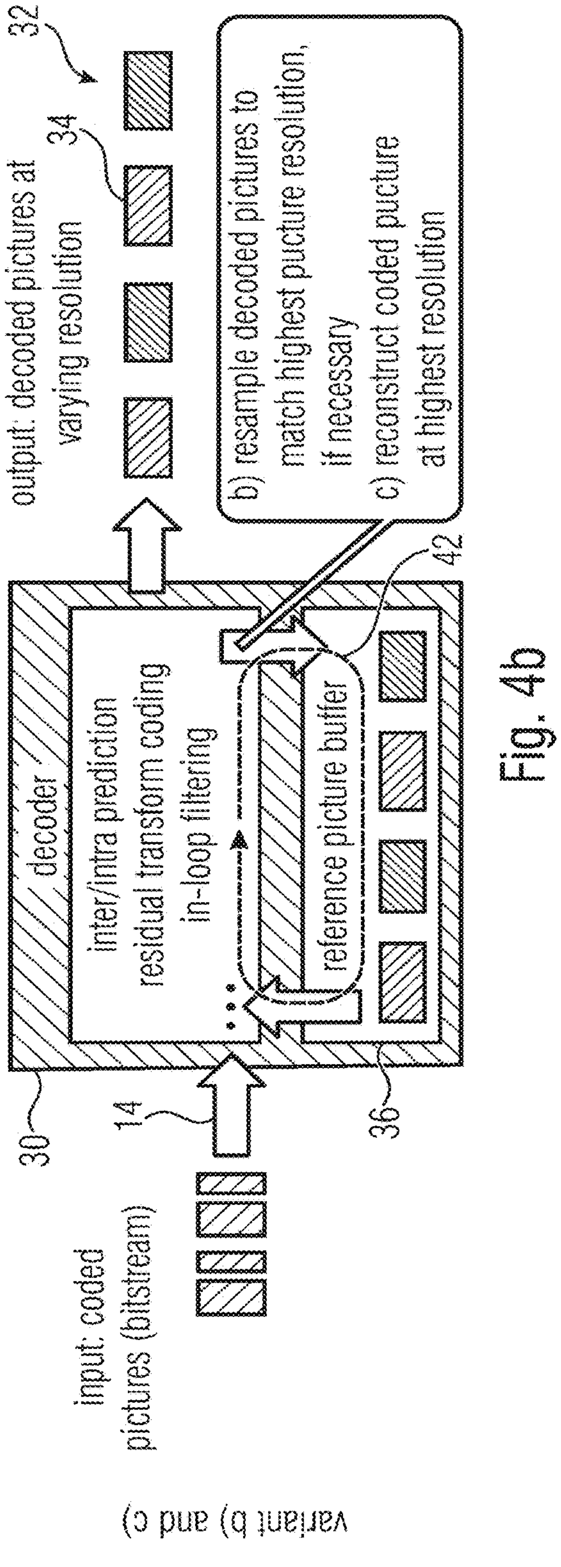

As already denoted above, there are different possibilities to implement the encoder and decoder of FIGS. 1*a* and 1*b*, respectively. These possibilities are denoted variant a, b and variant c in the following. FIGS. 4*a* and 4*b* illustrate variant a and variants b and c, respectively. FIGS. 4*a* and 4*b* concentrate on the decoder 30, but it is clear how to bring the encoder 10 into conformity with the respective concept/variant. In accordance with all variants, the prediction residual of each picture is coded in data stream 14 in the varying target spatial resolution as illustrated by rectangles of varying size at the left-hand side of FIGS. 4*a* and 4*b*. In accordance with the variant a, each picture is, in reconstructed form, buffered in the target spatial resolution. This is also illustrated by depicting the pictures of video in form of rectangles of varying size within DPB 36. The DPB 36 is serially connected into a prediction loop 42 which also exists in the encoder in order to keep synchrony with the decoder 30. In accordance with variant a, resampling 44 of a reference picture in the DPB 36 is carried out on-the-fly when this reference picture of a target resolution A is used as a reference picture by another currently decoded picture having a target spatial resolution B≠A. As illustrated in FIG. 4*a*, the decoder 30 may be a block based video decoder supporting inter and intra prediction modes and transform coding in order to code the prediction residual, i.e., residual transform coding, and in-loop filtering, for instance. As already stated, the pictures of the video output, namely of video 32, vary in resolution. It might be that a post processor not shown in FIG. 4*a* and also not in FIG. 1*b* is connected to the output of decoder 30 in order to resample the pictures 34 of video 32 to assume a constant output sample rate for presentation of the video.

FIG. 4*b* depicts variants b and c. In accordance with both variants, the pictures of the video are buffered in DPB 36 in a reference spatial resolution. In other words, each coded picture is reconstructed in the DPB 36 and then the entire picture is resampled at the highest resolution in DPB 36 if the highest is chosen the reference spatial resolution. In accordance with variant b, if need be, on-the-fly resampling is performed upon being referenced by pictures of a different resolution such as a lower resolution in case of using as the reference target spatial resolution a resolution being greater than or equal to any of the varying target spatial resolution values. The stream of output pictures, i.e., video 32, is output at the reference target spatial resolution such as the highest resolution. In accordance with variant c, the pictures are stored in the DPB 36 also on the reference target spatial resolution. If the picture resolution of a currently decoded picture is unequal to the reference spatial resolution, the residual signal or the prediction residual is resampled during reconstruction such as by bilinear filtering, with a stream of output pictures, i.e., video 32, being output at the reference spatial resolution just as it was the case in accordance with variant b. Thus, while in variant a, the DPB 36 is filled with pictures of varying resolution and each reference picture is resampled to the resolution of the currently coded/decoded picture upon reconstruction thereof, in variants b and c, the DPB 36 is filled with pictures of highest resolution only, which is achieved in two different ways.

Figure 5A:
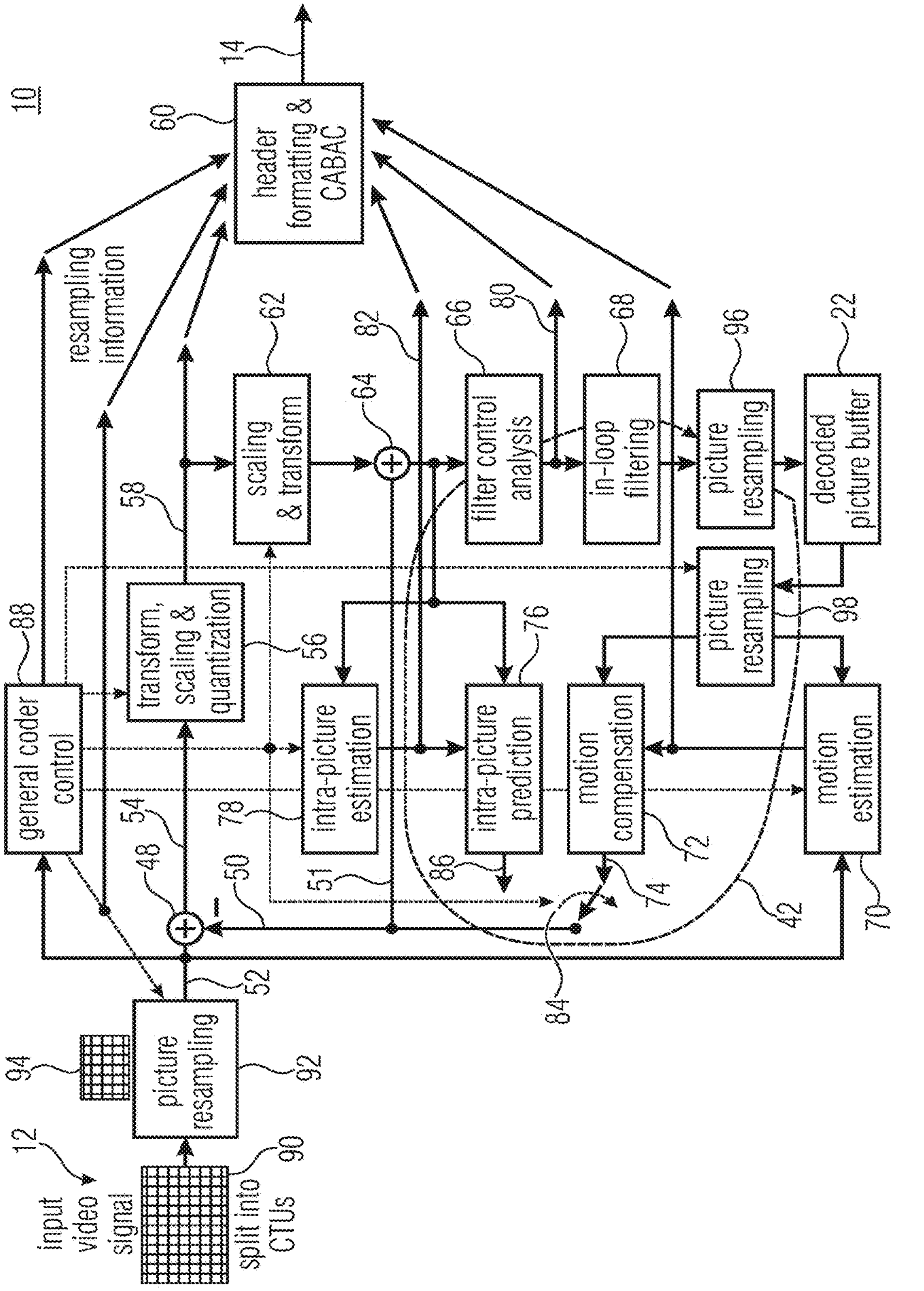
FIGS. 5*a* and 5*b* show block diagrams of encoders which form a possible implementation of the encoder of FIG. 1*a* and operate according to different variants at which the pictures are buffered in the decoded picture buffer at a reference spatial resolution, thereby fitting to the decoder of 4*b*, but differing in the side or domain at which the prediction correction is performed, namely at the varying target spatial resolution or the reference spatial resolution.
Figure 5B:
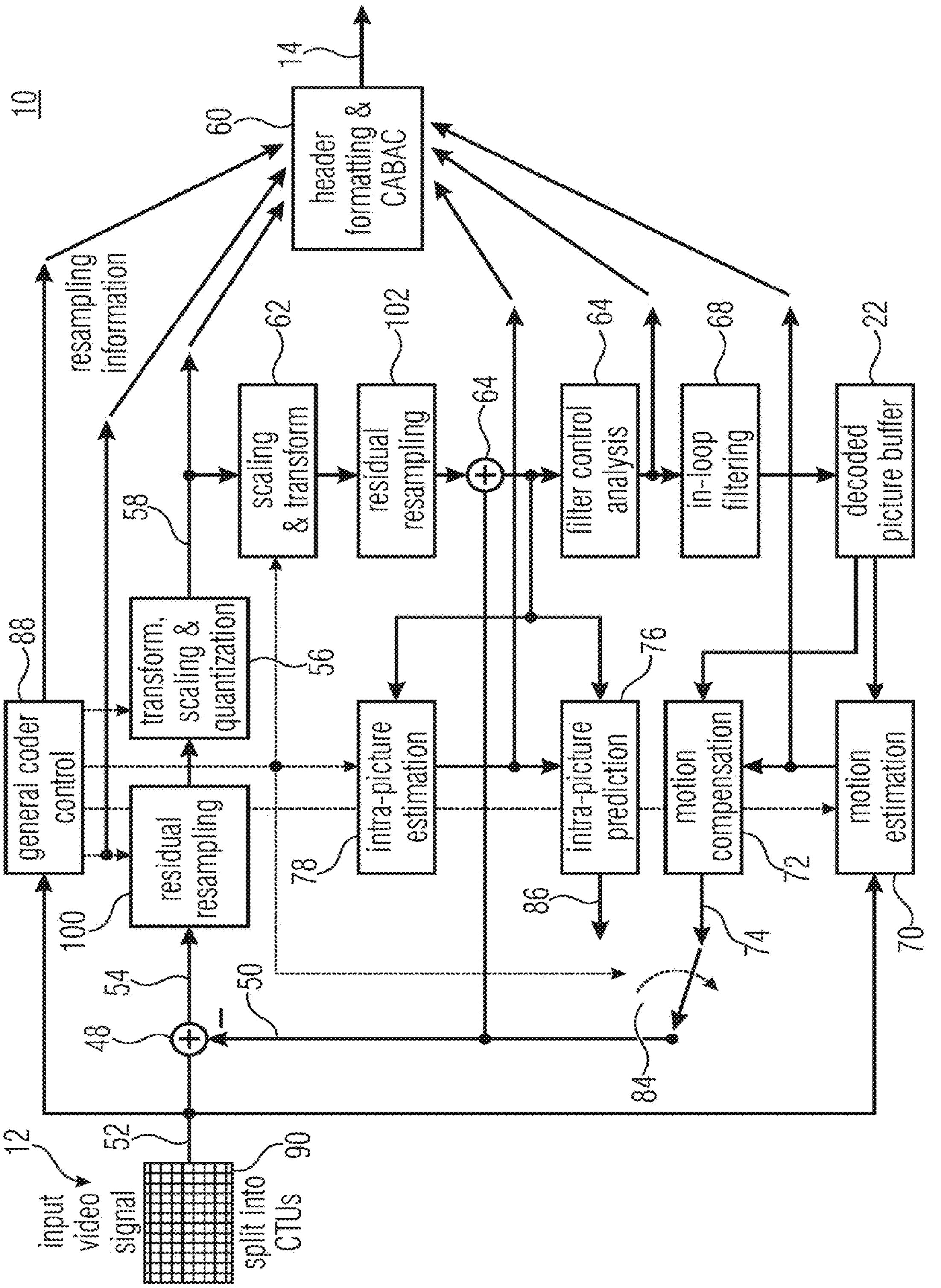

FIGS. 5*a* and 5*b* concentrate on the difference between variants b and c. FIGS. 5*a* and 5*b* concentrate on the encoder side. As already mentioned with respect to FIGS. 4*a* and 4*b*, the prediction loop 42 coexists in decoder and encoder and accordingly, all the tasks and steps described with respect to the decoder are also performed at the encoder side, the difference being that the encoder also choses or selects the parameter settings and coding parameters and so forth such as the prediction modes, i.e., inter or intra prediction mode, for example, the prediction parameters for the respective mode, the quantization of the transform prediction residual and so forth. The encoder may do this by performing some rate control and, in particular, by performing some cost minimization, i.e., with the aim of minimizing a cost depending on, for instance, distortion and coding rate.

In according with FIGS. 5*a* and 5*b*, the encoder 10 is implemented as a block based predictive video coder. That is, a subtractor 48 subtracts the prediction signal 50 from a source signal 52 in order to derive the undistorted prediction residual signal 54 which is then subject to a transformation, scaling and quantization in a module 56 to yield the prediction residual signal 58 as finally coded into data stream 14 via some stream multiplexer or module 60 performing formatting, entropy coding and the setting-up of headers for this data. In order to keep the synchrony with the decoder side, the encoder recovers the prediction residual signal in spatial domain by subjecting prediction residual 58 as derivable from data stream 14 to a scaling and inverse transformation or dequantization and inverse transformation module 62. Connected to the output of this module 62 is one input of an adder 64 which adds this prediction residual signal to the prediction signal 50 with a thus corrected prediction signal being subject to filtering by a concatenation of a filter control analysis module 66 followed by an in-loop filter 68. The result is buffered in the DPB 22 in order to buffer the reconstructed pictures and to form a reservoir for reference pictures referenced by inter-predicted blocks of subsequently coded pictures. A motion estimation module 70 has access to the source signal 52 in order to estimate a motion field of the source video and thus determines the motion vectors used to code the video. The pictures stored in the DPB 22 are made accessible for an inter-prediction module 72 which generates the predictors of inter-predicted blocks currently coded pictures, i.e., 74. For intra-predicted blocks, there is an intra-prediction module 76 which has access to the corrected prediction signal output by adder 64. Its prediction parameters, i.e., the intra-prediction modes, are determined by an intra-picture estimation module 78 on the basis of an analysis of the corrected prediction signal, i.e., the preliminarily reconstructed signal at the neighborhood of currently coded blocks. The prediction parameters of inter-predicted blocks such as motion vectors, i.e., 80, and the prediction parameters of intra-predicted blocks namely intra-prediction modes such as angular modes or non-angular modes such as DC or planar modes, i.e., 82, are passed forward to multiplexer 60 for signaling these prediction parameters along with the chosen prediction mode, i.e., inter/intra prediction mode decision, in data stream 14. A selector 84 composes the prediction signal 50 by choosing inter-prediction predictor 74 or intra-prediction predictor 86 depending on a prediction mode chosen for the various blocks of a currently coded picture and thus forms prediction signal 50. The encoder additionally comprises a general coder control 88 which assumes tasks like rate control and cost minimization.

FIG. 5*a* concentrates on variant b. As it is shown in FIG. 5*a*, the pictures 90 of the inbound video signal 12 are resampled at an initial resampling stage 92 to become pictures 94 of the varying target spatial resolution before these pictures 94 enter the encoder loop, i.e., before they are subject to subtraction by subtractor 48. It should be noted that this task is transparent to the decoder side which coincides in internal structure with the encoder 10 with respect to modules 62 and modules 64, 66, 68, the DPB 22 for which the reference sign 36 is used as far as the decoder side is concerned, and modules 72, 76 and 84 with the latter modules forming or being serially connected into prediction loop 42. The target spatial resolution variation may be controlled by the general coder control 88 as shown in FIG. 5*a*, depending on rate control and/or cost minimization. As the pictures 94 forming the source signal 52 for the encoder 10 of FIG. 5*a* are of varying spatial resolution, the encoder 10 of FIG. 5*a* comprises re-samplers which perform resampling to the target spatial resolution or from the target spatial resolution to the reference spatial resolution. For instance, a re-sampler 96 is connected into the prediction loop 42 in front of DPB 22 in order to resample the pictures before buffering in DPB 22 in the reference spatial resolution. That is, resampling is performed whenever the target spatial resolution of a currently coded picture is unequal to the reference spatial resolution. Further, a re-sampler 98 resamples reference pictures referenced by currently coded pictures and is, thus, connected between DPB 22 and the inter-prediction module 72, respectively, with the motion estimator 70 also having access to the sampled result. That is, re-sampler 98 resamples buffered pictures in DPB 22 from the reference spatial resolution to the target spatial resolution. The other blocks and modules shown using hatching are also configured to handle the varying target spatial resolution of the inbound pictures 94.

FIG. 5*b* concentrates on variant c. Here, the source signal 52 is formed by video 12 directly. In accordance with the example of FIG. 5*b*, the input resolution or source resolution of the source video 12 is used as the reference spatial resolution, but this example may be varied in that a re-sampler such as a re-sampler 92 performs an initial resampling from source resolution to reference spatial resolution. In accordance with variant c, as depicted in FIG. 5*b*, a re-sampler 100 is connected between the output of subtractor 48 and the input of transform, scaling and quantization module 56 in order to resample the undistorted prediction residual signal 54 to the varying target spatial resolution before transformation and quantization in module 56, wherein a re-sampler 102 performs the inverse process, i.e., the resampling from target spatial resolution to reference spatial resolution, by being connected between the output of inverse transform module 62 on the one hand and the first input of adder 64, i.e., the prediction correction performed by adder 64, on the other hand. That is, in accordance with variant c, which is shown in FIG. 5*b*, the resampling step is carried out on the prediction residual signal, thereby allowing reconstruction at the highest resolution.

The following description concentrates on a number of signaling possibilities in order to address needs which arise in accordance with variants a to c.

As already described above, the target spatial resolution may be allowed to change on a temporal scale corresponding to the picture pitch or frame rate. FIG. 6, for instance, illustrates that the target spatial resolution signalization 104 may be contained in the picture parameter sets of data stream 14, i.e., the PPS 106. This may be done in accordance with variants a to c. The signalization 104 according to the example of FIG. 6, indicates the picture size horizontally 108 and vertically 110. The possibility of using a varying target spatial resolution may be a mode which is signaled to be switched on or off by way of a flag 112 which is contained in the PPS 106 so that, if activated, the target spatial resolution of a corresponding picture is indicated by using syntax elements 108 and 110 which indicate the corresponding picture size, measured in number samples in x and y, or not if not activated.

A sequence scope constraint flag could trigger whether dynamic resolution is allowed or not. Such a flag could be contained in the SPS (sequence parameter set) or in a parameter set of an even larger scope such as of the whole video such as in the VUI. FIG. 7 shows an example, where such a flag is contained in the SPS 114, namely flag 116. The latter flag 116, namely SPS_dynamic_resolution_enabled_flag is set to 0, in order to signal that the value of flag 112, namely PPS_dynamic_resolution_enabled_flag, shall not be set to 1.

An alternative example would be that the picture size set, Pic Size Set, would be defined in a larger scope parameter set than the PPS, such as the SPS or VPS, and an index into the set would be contained in, or would accompany, every video slice NAL unit in the slice header. The example is depicted in FIGS. 8 and 9. This time, the SPS 114 contains, beyond flag 116, if the latter flag is set, a target spatial resolution signalization 118 which signals the picture size or target spatial resolution by way of syntax elements 108 and 110 once per possible value or possible state of the target spatial resolution, and the slice header 120, an example of which is shown in FIG. 9, references to one of these possible values or states by way of an index 122, thereby indicating for the respective picture the slice of the slice header 120 belongs to, refers to the respective target spatial resolution indicated by way of signalization 118. All slices in one picture may be used to indicate the same, or index the same, target spatial resolution.

In accordance with an embodiment, it is possible to signal within the data stream 14 as to which possibility has been used in order to allow for the variation of the target spatial resolution. For instance, a flag output_scaling_flag or some other signaling could indicate whether the resampling is done as a pre/post processing step or as a normative in-loop resampling step. This would allow to distinguish variant a, i.e., resampling out of decoding loop, from variants b and c where the resampling is done within the decoding loop 42. In this case, multiple modes, i.e., variant a on the one hand and at least one of variants b and c on the other hand, would be implemented in the codec and encoder, decoder respectively. In this manner, a decoder is enabled to configure the elements further down the multimedia processing chain up to the display of whether dynamic adjustments to the resolution of the decoded video signal should be performed before presentation.

A further signaling which could be contained and inserted into data stream 14 could contain aspect ratio signaling. In particular, in HEVC, for example, there are several bitstream signaling aspects which are sequence specific and are not allowed to change within a CVS. As in the embodiments described so far, the resolution, i.e., the target spatial resolution, is allowed to change within a coded video sequence, CVS, such signaling should by dynamic, i.e., these aspects should be described in a dynamic way. For instance, let's take the signaling aspect of sample aspect ratio: reducing the resolution of a picture of source signal 12 may be achieved in multiple ways, namely by resampling horizontally, or resampling vertically, or by resampling in both directions, for instance. All three of the just-mentioned options may use different resampling ratios for a given target resolution, which would lead to different sample aspect ratios. Therefore, changing resolution would change coded sample aspect ratios. One option is to define a default way that the aspect ratio applies to the one of the picture sizes such as the first one or the biggest one defined in the SPS over all possible picture sizes. Another possibility is to specify a reference picture size to which the signaled aspect ratio applies and leave it up to decoder 30 or some renderer connected to the output of the decoder, to derive which is the sample aspect ratio of the other formats. See, for instance, FIG. 10. FIG. 10 shows that the data stream may contain information or signaling indicating the output aspect ratio at 126. FIG. 10 illustrates that this information 126 may be contained in the vui 124 but this is merely an example. That is, signalization 126 indicates the aspect ratio in x or horizontally 128 and the aspect ratio in y or vertically 130 for one possible setting of the target spatial resolution such as the reference spatial resolution, and the decoder or some device receiving video 32 uses this aspect ratio in order to present the video 32 for pictures in the respective spatial resolution. In case of varying picture sizes of video 32 such as variant a, the aspect ratio signalization 126 is used for pictures in the corresponding spatial resolution such as the reference spatial resolution, and for pictures at another resolution, the aspect ratio for presentation is determined on the basis of signalization 126 and respective target spatial resolution or picture size of the respective picture. This is, for another picture size with pic_width_in_luma_samples [i] and pic_height_in_luma_samples [i], the aspect ratio for that picture can be derived as:

$$\text{sar\_width}[i] = \text{sar\_width\_default} / \text{pic\_width\_in\_luma\_samples\_default} * \text{pic\_width\_in\_luma\_samples}[i]$$

and $$\text{sar\_height}[i] = \text{sar\_height\_default} / \text{pic\_height\_in\_luma\_samples\_default} * \text{pic\_height\_in\_luma\_samples}[i]$$

Note that in the example calculation above, it is assume that there are no cropping parameters. pic_width_in_luma_samples [i] and pic_height_in_luma_samples [i] correspond to the whole decoded picture, while the cropped picture is the part of that is output. Two different resolutions could use completely different cropping windows and therefore the computation above would involve performing the cropping before computing the relationship between sar_width and sar_height of the different resolutions. I.e., $$croppedWidth[i] = \text{pic\_width\_in\_luma\_samples}[i] - (\text{conf\_win\_right\_offset}[i] + \text{conf\_win\_left\_offset}[i])$$

$$croppedHeight[i] = \text{pic\_height\_in\_luma\_samples}[i] - (\text{conf\_win\_top\_offset}[i] + \text{conf\_win\_left\_offset}[i])$$

and therefore:

$$\text{sar\_width}[i] = \text{sar\_width\_default}/\text{croppedWidth\_default}^{*}croppedWidth[i]$$

and $$\text{sar\_height}[i] = \text{sar\_height\_default}/\text{croppedHeight\_default}^{*}croppedHeight[i]$$

However, typically these sample aspect ratio values are used in well-defined interfaces for post-processing, where direct values from VUI are used to configure post-processing steps. Although the above computation is simple and could be performed easily, a simpler approach that would allow using existing interfaces and APIs with minimal changes, would be to directly signal the different aspect ratios for each resolutions in a similar manner than done today.

For example, a first option would be to describe several aspect ratios, one per signaled picture size as illustrated in FIG. 11.

Here, the signalization 126 indicates an aspect ratio for outputting the pictures of video 32 for each possible setting of the target spatial resolution, the number of which is indicated by num_pic_in_luma_samples_minus1. FIG. 11 shows the possibility that an alternative way or alternative option of indicating the aspect ratio would be to index some of predefined aspect ratios by an index 132.

The signaling example of FIG. 11 may be further improved and be done more efficiently for some cases. Know that in the example of FIG. 11, there is same number of sample aspect ratios described as picture sizes. Alternatively speaking, FIG. 11 indicates the sample aspect ratio for each possible setting of the target spatial resolution. It could happen, however, that the sample aspect ratio is equal for all picture sizes or all possible settings of the target spatial resolution of that the number of sample aspect ratios assumed is at least smaller than the number of picture sizes or target spatial resolutions. Therefore, the signaling of the aspect ratios may be done as depicted in FIG. 12. Here, a flag 134 could indicate whether all aspect ratios are equal, i.e., that all pictures of video 32 have the same aspect ratio. If yes, the signaling 126 merely has to be signaled once for all pictures. Otherwise, the number of different aspect ratios is signaled at 136 and then the signaling 126 is contained in the data stream as often as indicated by 136. For each picture, it is then indicated as to which target spatial resolution is used, namely by way of the picture size indication 104 or 122, and indirectly, this selection of the target spatial resolution to be used also indicates the aspect ratio to be applied and the presentation of video 32 or the respective picture, namely by associating the correct aspect ratio to each target spatial resolution.

In a similar fashion as described so far, the following parameters may be contained in the data stream 14.

In a similar fashion as above, signaling for the following parameters may be present in the data stream:

| | |
|---|---|
| min_spatial_segmentation_idc | ue(v) |

min_spatial_segmentation_idc indicates parallel processing capabilities. E.g., the maximum number of luma samples that are contained within a slice (when no tiles are used and wavefront processing is not enabled-entropy_coding_sync_enabled_flag is equal to 0) is thereby constraint. Or if tiles are in use, the maximum number of luma samples that are contained within a tile is thereby constraint. Another parallel processing mode is when entropy_coding_sync_enabled_flag is equal to 1 (wavefront processing), where CtbSize and the picture sizes determines the number of "wavefront" rows; the value of min_spatial_segmentation_idc sets constraints on the relationship of CtbSize and the picture size. For any of these parallel processing modes (slices, tiles, wavefront) the value of min_spatial_segmentation_idc set constraints as discussed above dependent on the picture sizes. Specification text of HEVC follows for better understanding:

Otherwise (min_spatial_segmentation_idc is not equal to 0), it is a requirement of bitstream conformance that exactly one of the following conditions shall be true:

In each PPS that is activated within the CVS, tiles_enabled_flag is equal to 0 and entropy_coding_sync_enabled_flag is equal to 0 and there is no slice in the CVS that contains more than $$(4^{*}PicSizeInSamplesY)/\text{min}SpatialSegmentationTimes4 \text{ luma samples.}$$

In each PPS that is activated within the CVS, tiles_enabled_flag is equal to 1 and entropy_coding_sync_enabled_flag is equal to 0 and there is no tile in the CVS that contains more than $$(4^{*}PicSizeInSamplesY)/\text{min}SpatialSegmentationTimes4 \text{ luma samples.}$$

In each PPS that is activated within the CVS, tiles_enabled_flag is equal to 0 and entropy_coding_sync_enabled_flag is equal to 1 and the syntax elements pic_width_in_luma_samples, pic_height_in_luma_samples and the variable CtbSizeY obey the following constraint: (2*pic_height_in_luma_samples+pic_width_in_luma_samples)*CtbSizeY<=(4*PicSizelnSamplesY)/minSpatialSegmentationTimes4

Taking into account that the picture sizes or the target spatial resolution can change from picture to picture, the min_spatial_segmentation_idc may be signaled in a more flexible way. In a similar way as for the aspect ratio, signalling of min_spatial_segmentation_idc can be done:

For a specific picture size, where same constraints in term of luma samples per slice/tile apply for other picture sizes With a per picture size min_spatial_segmentation_idc [i].

Another example pertains:

| | |
|---|---|
| max_bytes_per_pic_denom | ue(v) |

max_bytes_per_pic_denom indicates the number of bits that are not exceeded by the sum of sizes of the VCL NAL units of a coded picture of a CVS ((PicSizelnMinCbsY*RawMinCuBits)/(8*max_bytes_per_pic_denom)). It is also dependent on the picture size.

Therefore, in a similar way as above, it should be indicated for several picture sizes as follows:

For a specific picture size, where same constraints for any picture size apply.

With a per picture size min_spatial_segmentation_idc[i].

Another example pertains:

| | |
|---|---|
| max_bits_per_min_cu_denom | ue(v) |

max_bits_per_min_cu_denom indicates an upper bound for the number of coded bits of coding_unit( ) in the CVS. It depend on the Ctb sizes and minCbLog2SizeY as follows:

$$(128+RawMinCuBits)/\text{max\_bits\_per\_min\_cu\_denom}*(1\ll(2*(\log2CbSize-\text{Min}Cb\text{Log2}SizeY)))$$

In a multi-resolution coding scheme as considered here it could be envisioned that the Ctb sizes and minimum coding block sizes (minCbLog2SizeY) are dependent on the picture size. Taking that into account, different values for different picture sizes could be envisioned.

Another example pertains:

| | |
|---|---|
| log2_max_mv_length_horizontal | ue(v) |
| log2_max_mv_length_vertical | ue(v) |

Similarly, the constraints for the 2 syntax elements for MVs can be used for parallelization. They express a constraint on the MVs that are applied for a coded picture. With this information, it is possible for a decoder to know whether enough data has been reconstructed from a picture (still being decoded) to start decoding another picture that references it. Since picture sizes might be different, as for previous cases per picture size indication may be used.

With the following options:

For a specific picture size, where the MVs are scaled correspondingly to each picture size.

With a per picture size log 2_max_mv_length_horizontal[i] and log 2_max_mv_length_vertical[i].

Figure 13:
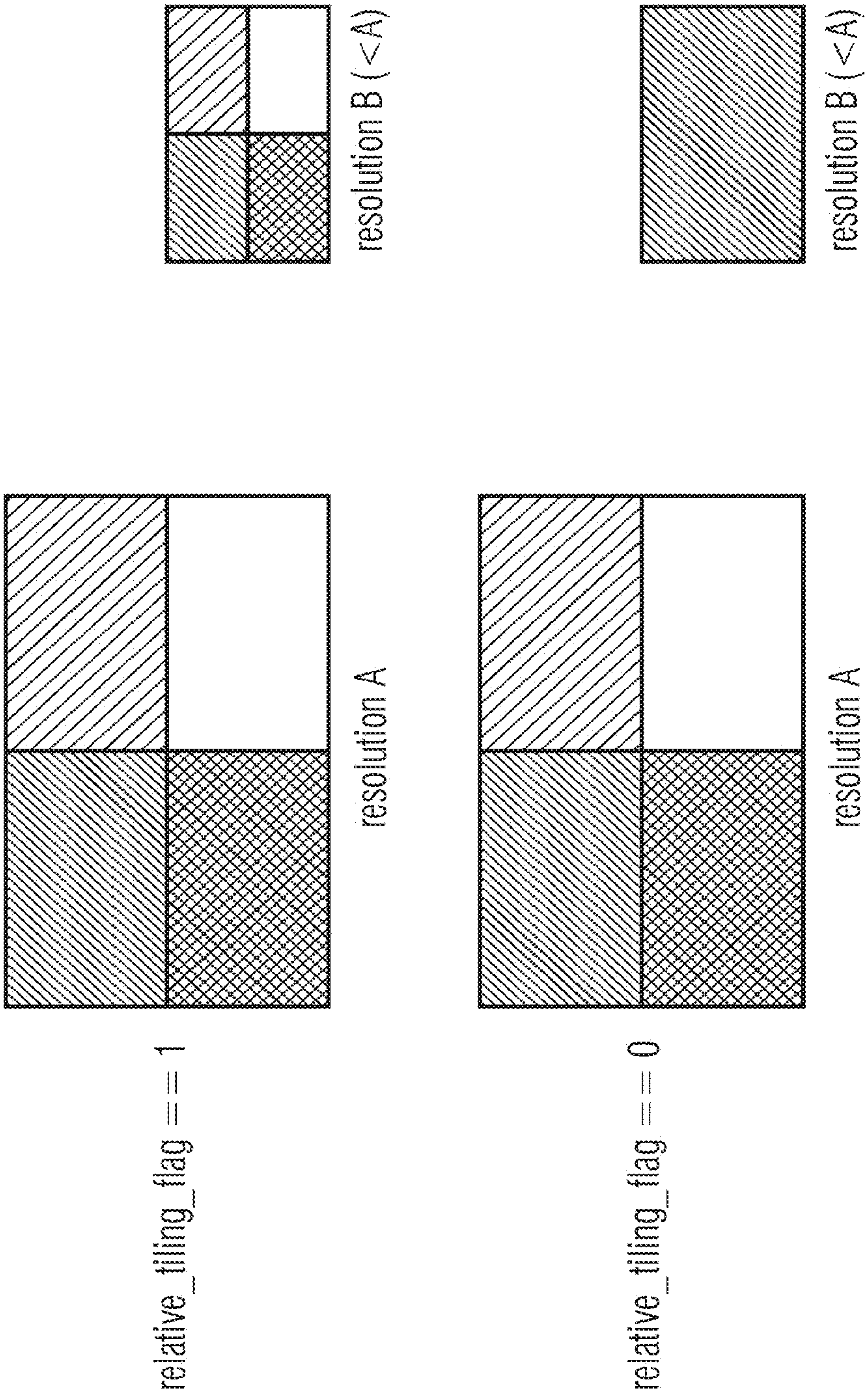
FIG. 13 shows a schematic diagram illustrating the possibility of signaling by one flag a relative tiling of pictures according to their varying target spatial resolution.

In some scenarios, such as tile streaming, where the same content is offered to a client at varying overall resolution (e.g. to accommodate devices with FullHD or 4K video decoders) it can be desirable to maintain a constant tile structure relative to the picture plane, regardless of picture size or aspect ratio. One embodiment is a flag (relative_tiling_flag) that indicates that a signaled tile structure (e.g. a default structure signaled with a sequence scope) at the highest are reference spatial resolution (resolution A) is also to be used for pictures with smaller resolutions (resolution B) in the bitstream, the tiling structure being scaled for smaller resolutions relative to the respective picture sizes as illustrated in the top of the following FIG. 13. On the bottom of FIG. 13, the case for non-relative tiling is displayed, where, exemplarily, a picture at the resampled resolution B (<A) completely fits into a single tile of the original resolution. In this embodiment, the tiling structure is only signaled for one resolution but at a sequence scope, e.g. in SPS. Other syntax with picture scope, e.g. PPS, omit the respective syntax.

First, this could allow to save bits by avoiding redundant tiling signaling for each resolution. Second, the fact that the amount and relative dimensions of tiles remain constant over the course of a coded video sequence allows more efficient resource planning on decoder side, where the decoder can avoid to reassess the degree of parallelization to be used in the decoding process for each individual picture. Especially the fact that the relative dimensions of tiles remain constant over pictures of different resolution allows to presumptions about decoder runtime for the individual tiles that can help to simplify decoder resource planning.

In another embodiment, the signaling may consist of a sequence level guarantee that is included in the bitstream and indicates that the tiles are aligned for all pictures within the same spatial layer, even if spatial resolution changes within the layer. A decoder may use this guarantee to reserve parallel decoding resources accordingly or decide whether it is capable of decoding the bitstream by the means of parallel processing. Multiple tile structures may be sent within the bitstream, but all of these structures are identical or a subsampled equivalent of the same tile structure.

A further embodiment consists of a flag in the bitstream that indicates a guarantee that the tile structure is aligned within the same spatial layer when resolution changes within that layer, in a way that for all tile boundaries that exist in a lower resolution, an aligned tile boundary exists at the higher resolution. Pictures that are coded in the higher resolution may still contain additional tile boundaries. Multiple tile structures may be send within the bitstream, but all structures at the lower resolution are identical and an equivalent tile structure exists at the higher resolution.

In case a decoder performs random access (RA) into a coded bitstream, i.e. starts decoding from any RAP midstream, the leading pictures belonging to an open GOP RAP such as an CRA are typically discarded and decoding/presentation starts from the RAP picture. Depending on the system variant a, b, or c knowledge on decoder side about the resolutions in the bitstream differs.

In variant a), the decoder may be informed through picture-level scope syntax at an RAP about the resolution of the current picture, which after decoding resides within the DPB at the specific resolution. Each reference picture in the DPB at its specific resolution that may be used for decoding of the current picture at another resolution is resampled to the resolution of the current picture.

In variant b) and c), at an RAP, sequence level scope syntax may inform the decoder about the maximum resolution within the bitstream, while picture level scope syntax informs the decoder about the resolution of the current picture to be decoded in order to allow the decoder to resample all pictures to the highest resolution.

The following description is about annexed aspects of the present application, namely about video coding allowing for region-wise packing, i.e., a scene-wise subdivision of pictures into picture regions each being associated with a certain scene section or scene region of the scene. In accordance with this aspect, the video codec is sensitive to the region-wise packing or scene packing/partitioning. Scene packing/partitioning may be done in a manner so that different scene regions are conveyed in the data stream at different scene sampling density or different scene resolution thereby ending-up into sub-picture scene resolution change. There are different occasions at which it seems to be worthwhile to vary the spatial scene resolution within a picture of a video sequence during coding, i.e., to represent individual subsections of a scene at different spatial resolutions. Such means can be used either to increase coding efficiency of a codec, i.e., as another means to reduce the bitrate span for a given picture area, or to reduce codec memory requirements for handling the samples of a decoded picture by reducing the amount of these samples before handling the decoded picture to a post-decoder resampling engine. However, video codecs available so far are oblivious to such measures and system standards that rely on such subpicture resampling such as MPEG OMAF which do so with pre and post processing without awareness of the codec. Here, the picture is divided into subpictures or regions and these regions are rearranged or packed within the coded picture. In state of the art codecs, only metadata of these packing steps is carried within the video bitstream, i.e., in the form of so-called region-wise packing SEI messages to reverse the processing before presenting the video. In accordance with the embodiments described further below, the idea is to facilitate the knowledge about the packing format in codec tool decisions and the coding process. For example, a normative region-wise packing (RWP) syntax may be introduced, e.g., in the PPS, which defines regions of a so-called unpacked picture, i.e., the original picture where all regions are arranged with correct neighboring context at equal spatial resolution and at correspondence to regions in a packed picture. The described image transformations between regions in the unpacked and packed picture may include translation, scaling, mirroring and so forth.

Figure 14A:
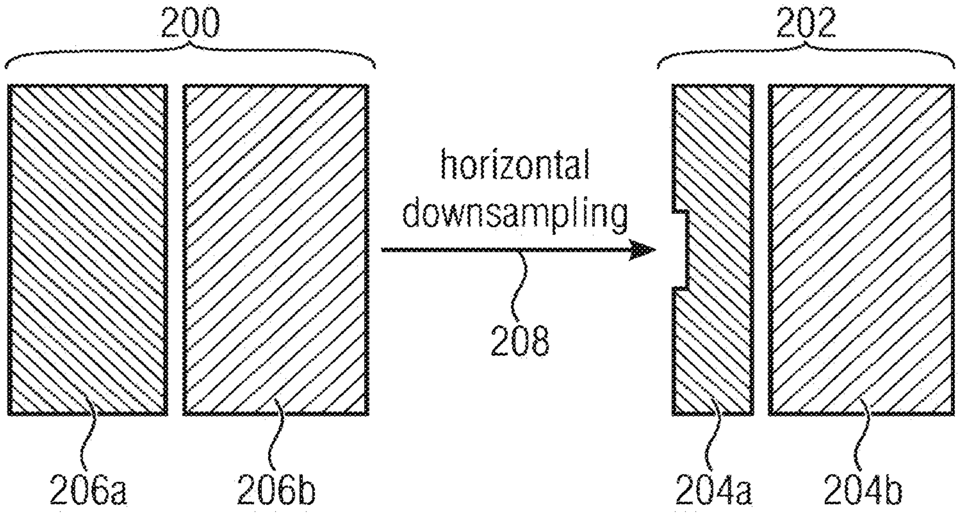
FIGS. 14*a* and 14*b* show schematic diagrams illustrating examples for a scene partitioning or region-wise packing.
Figure 14B:
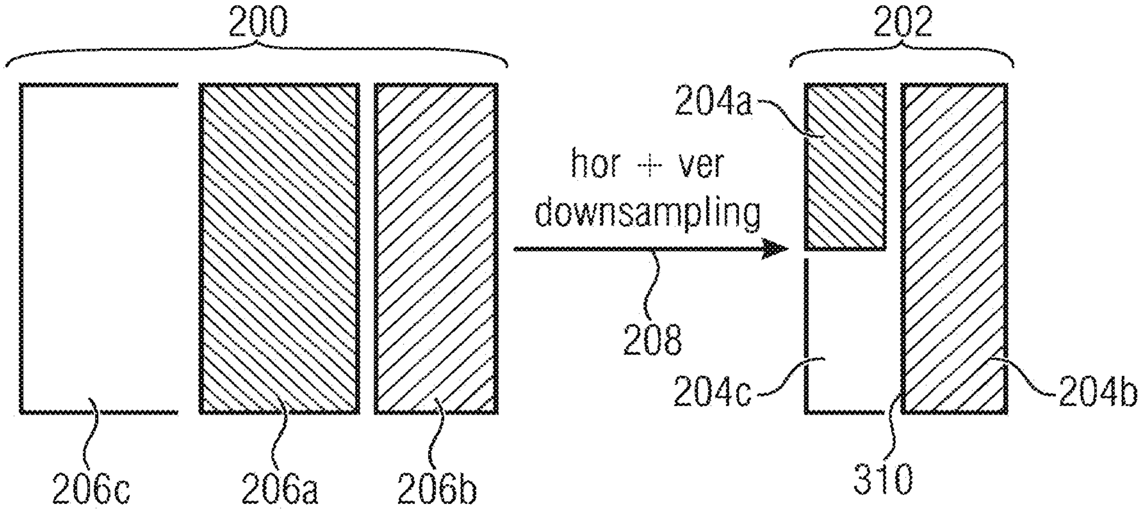

FIGS. 14*a* and 14*b* provide illustrations of two exemplary RWP scenarios. In these figures, the left-hand side shows the unpacked picture 200, i.e., the scene, and the right-hand side shows the packed picture 202, i.e., the coded pictures. Unpacked picture 200 and packed picture 202 are shown at uniform sample resolution. The packed picture 202 is subdivided into picture regions 204. Each picture region 204 has associated therewith a corresponding scene section 206 out of the unpacked picture 200 the correspondence or association being illustrated by use of letters a, b and c. The partitioning of picture 202 into picture regions 204 and the mapping of these picture regions 204 to the scene sections 206, illustrated by the arrow 208, is signaled in the data stream via RWP information or scene packing/partitioning information and this mapping 208 may involve a different resampling or spatial scaling for the picture regions 204 as becomes clear from FIGS. 14*a* and 14*b*.

Figure 15A:
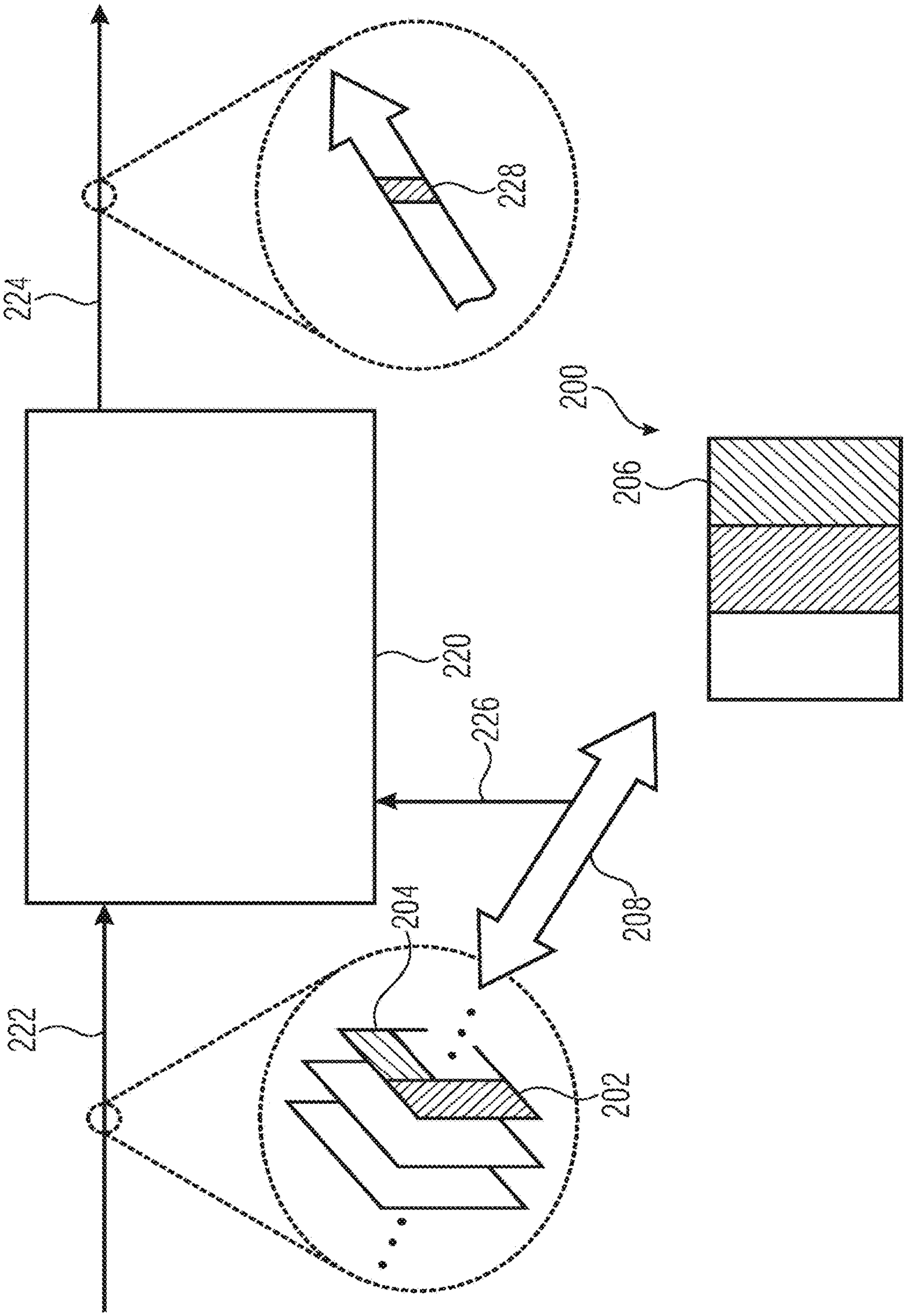
FIG. 15*a* shows a schematic block diagram illustrating a video encoder in accordance with an embodiment where the video encoder operates sensitive to a scene partitioning or region-wise packing, respectively.

Thus, in accordance with the embodiments described further below, RWP syntax may be used in order to describe this scene partitioning/packing, and the embodiment described herein after introduce numerous coding tool restrictions, alterations and signaling which may be used in order to exploit in the codec the knowledge about this scene partitioning. For ease of understanding the following description, the general framework of encoder and decoder is described with respect to FIGS. 15*a* and 15*b*. FIG. 15*a* shows the video encoder 220. The video encoder 220 is configured to encode an inbound video 222 into a data stream 224 where each picture 202 of the video 222 is, according to a scene partitioning 208, partitioned into picture regions 204 each having mapped there onto, by way of the scene partitioning 208, a respective scene region 206 of a scene 200. The video encoder 220 supports an adjustment of the scene partitioning 208. For instance, video encoder 220 comprises an input for receiving information 226 on the scene partitioning 208 which might have been performed by a module connected to the video encoder's input when providing video 222, based on a video or video data representing scene 200. The video encoder 220 is configured to signal the scene partitioning in data stream 224. For instance, information of the scene partitioning 208 is illustrated to be comprised in data stream 224 at 228 in FIG. 15*a*. In a manner described in more detail below, the video encoder 220 is configured to encode the video 222 into the data stream 224 in a manner dependent on the scene partitioning 208 or the information 226, respectively.

Figure 15B:
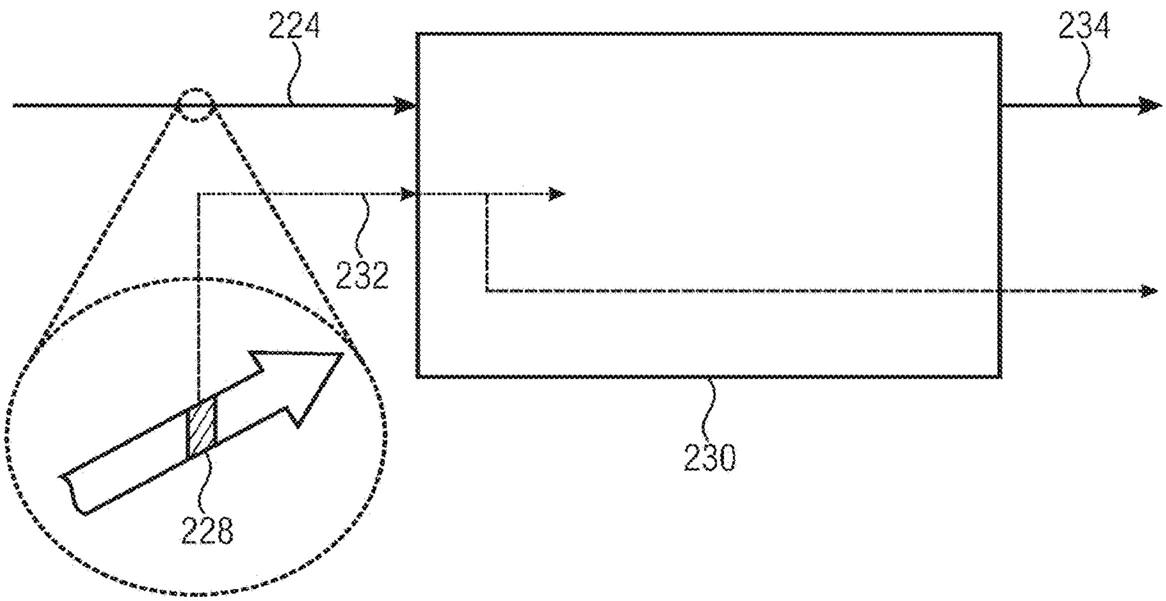
FIG. 15*b* shows a schematic block diagram of a video decoder fitting to the video encoder of FIG. 15*a*, likewise operating sensitive to or performing the video decoding dependent on the scene partitioning

A corresponding video decoder is illustrated in FIG. 15*b*. The video decoder of FIG. 15*b*, namely 230 is configured to receive the data stream 224 having the video 222 encoded there into, and derives from the data stream 224 the scene partitioning information 228. As depicted by dashed line 232, the decoder 230 may optionally pass forward the scene partitioning information to a recipient of the reconstructed video 234 which the video decoder 230 outputs and represents a reconstruction of video 222. Importantly, the video decoder 230 is configured to decode the video 234 from the data stream 224 in a manner dependent on the scene partitioning information 228. The following description provides specific examples for this dependency.

In particular, as described so far, the scene partitioning information 228 may be conveyed in the data stream at some temporal scale such as at picture level, sequence of pictures level or group of pictures level or intermittently updated such as in the case of SEI messages, the scope of which yields up to the next update of the scene partitioning 208 by way of another SEI message. As can be seen from FIGS. 14*a* and 14*b*, owing to the scene mapping 208, different picture regions 204 of the pictures of the coded video 222 may depict objects in the scene 200 at different scene sampling density or scene sampling resolution which circumstance should be taken into account in prediction processes, for instance, as it will be outlined in more detail below. Further, the different scene sampling density, i.e., the different number of samples per unit area of the scene 200, for the picture regions may result into different coding parameters being an optimal solution for efficiently coding the respective picture region 204. It may, accordingly, be advantageous to allow for a picture region-wise setting of such parameters. Even further, owing to the scene partitioning 208 and especially the change in spatial neighborhood relationship between the picture regions when comparing the picture 202 on the one hand and the scene 200 on the other hand, interfaces between neighboring pictures regions 204 may represent interfaces where the picture content at both sides of these interfaces do not relate to immediately neighboring portions in the scene 200. It does, accordingly, not make sense to filter thereacross, for example. The following description reveals examples as how to take this into account in the encoding and decoding process.

Figure 16:
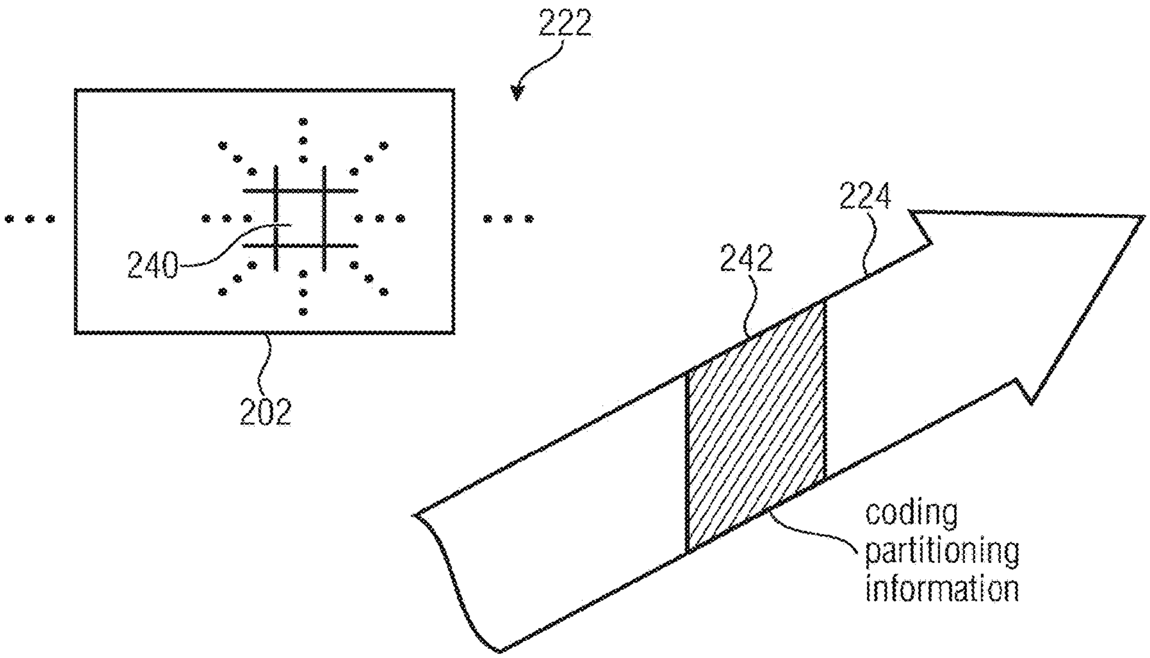
FIG. 16 shows a schematic diagram illustrating a coding partitioning used for video encoding and decoding in the video encoder and decoders of FIGS. 15*a* and 15*b* and the corresponding coding partitioning information conveyed in the data stream in order to illustrate possibilities for the dependency of video encoding and decoding on the scene partitioning.

The following description, for example, pertains to the relationship between coding partitioning on the one hand and scene partitioning on the other hand. To explain this, please see FIG. 16. FIG. 16 shows one picture 202 of video 222. In order to encode the video 202 into data stream 224, video encoder 220 and video decoder 230 partition the pictures 202 of video 222 into blocks 240. In units of these blocks 240, the video 222 is coded into the data stream 224. For instance, in units of these blocks, video encoder and video decoder may perform prediction residual coding/decoding. The partitioning of picture 202 into blocks 240 could, thus, be a partitioning into transform blocks. Alternatively, video encoder and decoder perform the video encoding/decoding with switching between intra-prediction and inter-prediction mode in units of blocks 240. The blocks 240 could, thus, be coding blocks or coding units and data stream 224 could convey a prediction mode decision with respect to each block 240. And even alternatively, video encoder and decoder could set the prediction parameters for intra-predicted blocks and inter-predicted blocks in units of blocks 240. That is, blocks 240 could be prediction units or blocks. And even alternatively, blocks 240 could be tiles into which picture 202 is partitioned wherein the coding/decoding of these tiles 240 would be done without coding interdependencies. The data stream 224 could contain coding partitioning information 242 on how to partition picture 202 into blocks 240.

Figure 17:
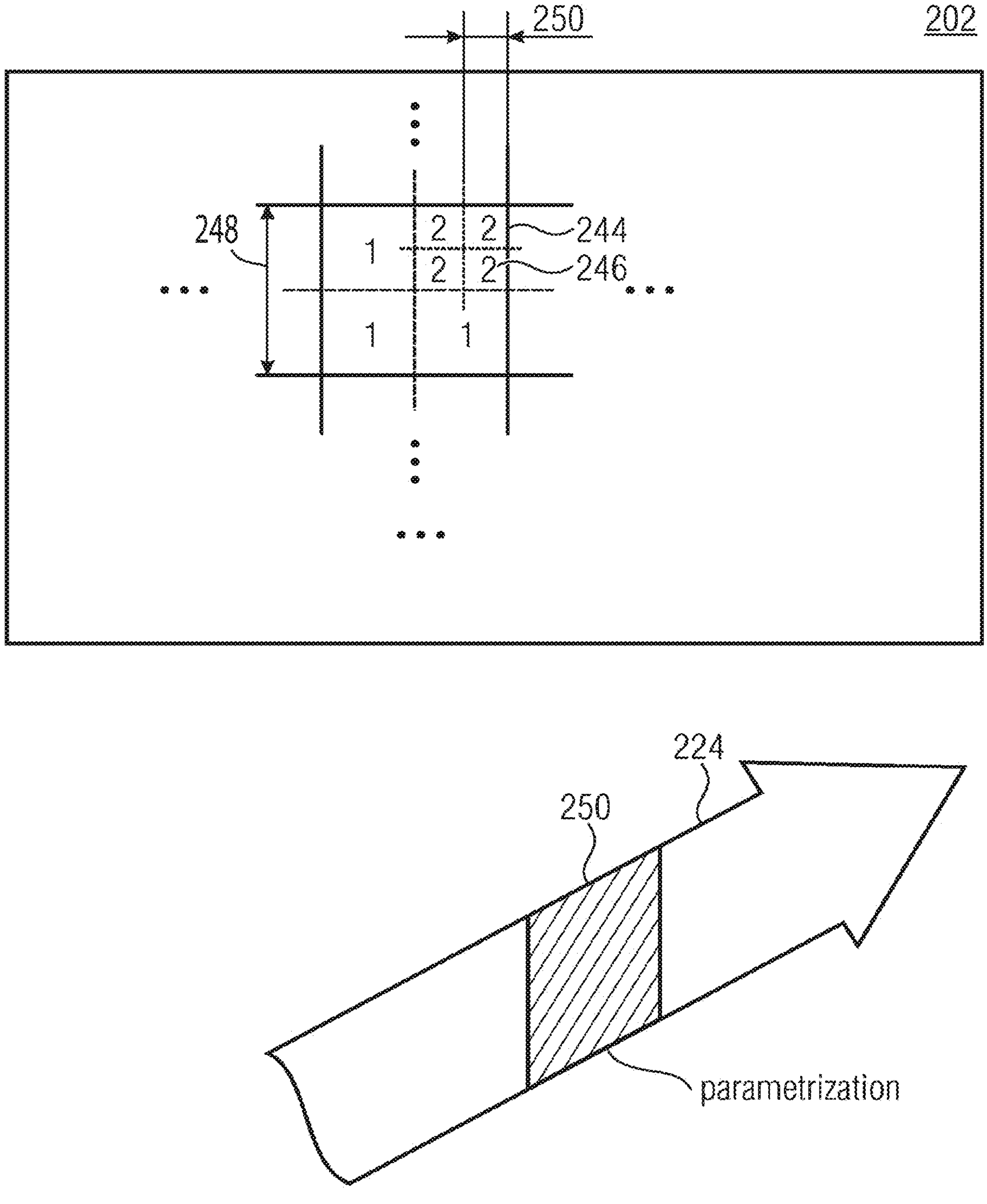
FIG. 17 shows a schematic diagram illustrating an example of a coding partitioning using a sequence of regular tree block partitioning into an array of tree blocks followed by hierarchical multi-tree subdivisioning of the tree root blocks in order to illustrate the parameterization of such coding partitioning and in order to illustrate the possibility to take into account the scene partitioning in such coding partitioning.

In the possibility described next, video encoder and decoder enable a parameterization of the coding partitioning in a manner so that the parameterization may be done individually for the picture regions 204 of picture 202. The coding partitioning may, for instance, be defined as illustrated in FIG. 17. A pre-partitioning into an array of tree root blocks 244 may pre-partition the picture 202. These tree root blocks 244 may then be subject to a hierarchical sub-tree partitioning as illustrated by dotted lines in FIG. 17. The leaf blocks of this hierarchical multi-tree subdivisioning, indicated using reference sign 246 in FIG. 17 may, for instance form blocks 240. In that case, the size of the tree root blocks 244, indicated at 248 in FIG. 17, would define a maximum block size of the resulting blocks 246. A parametrization may, for instance, define this maximum block size. The parameterization may also define a minimum block size 250 for the leaf blocks and/or a maximum number of hierarchical split levels allowed in the hierarchical multi-tree subdivisioning. The zero split level would, for instance, correspond to no split at all, i.e., leaving the tree root block 244 as it is and using this as block 240. A split level of one would correspond to a first splitting-up of the tree root block 244 into a number of regions of a first split level. In the example of FIG. 17, some leaf blocks 246 are of the first split level and have a one inscribed therein. Regions of the first split level which are further split into sub-regions result into sub-regions of the second split level and in FIG. 17, there are leaf blocks 246 of such a hierarchical level exemplarily shown with having a two inscribed there into. Thus, the maximum number of such hierarchical split levels may be a further parameterization for the coding partitioning. And a difference between minimum and maximum block size may be indicated, too. The encoder may select these parameterizations for each picture region 204 and signal the parameterization 252 for the respective picture region 204 in data stream 224. The video decoder may use the parameterization 250 in order to perform the coding partitioning on the basis of information 242. For instance, on the basis of the maximum block size 248, the decoder may perform the pre-partitioning into tree root blocks 244. On the basis of the minimum block size or the indication of the maximum block number of hierarchical split levels or the indication of the difference between minimum and maximum block size 248 and 250, respectively, the decoder may infer that certain splits are not feasible anyway. Accordingly, for such splits the encoder does not signal a corresponding split flag in the coding partitioning information 244, and the decoder does not pass a respective split flag from data stream 224. With calling the tree root blocks 244 CTUs, and taking the syntax of HEVC as a basis, FIG. 18 provides an example for partitioning parameters defined on a picture region 204 basis. According to FIG. 18, different max/min CTU sizes are defined per picture region 204. Here, the CTU sizes defined in HEVC are used as an example. While in HEVC, CTU sizes are defined generically for the whole coded video sequence CVS and the whole picture, respectively, according to the example of FIG. 18, the syntax of HEVC is extended so that the signaling is done on a per region basis, i.e., per picture region 204. In particular, FIG. 18 shows an SPS indicating by a flag 254 that picture regions 204 are defined and as previously explained, they may be of different scene resolution or scene sampling density. If the partitioning into the picture regions 204 is applied, i.e., scene partitioning applies, then the parameterization 250 is signaled several times with the number indicated at 256. The number 256 may equal the number of picture regions or may be lower than that and the data stream 224 may contain indices to the various parameterization settings for each parameter region 204 in the various pictures.

The parameters could alternatively be implicitly derived from a single set of default parameters with knowledge about the different sampling of regions within the pictures.

Then, the mapping of the areas of the pictures 202 could be done in different manners: For example, slices of pictures 202 could be mapped to resolution areas, i.e., to one of the number of parameterizations 250, the number indicated at 256. The mapping could be done in units of the aforementioned and independently coded tiles. That is, each tile could be associated with one of the parameterizations 250. Alternatively, at the sequence or picture parameter set level, depending on the desired codec flexibility, pictures 202 could be sub-divided into resolution areas which are coarser or finer than a partitioning into slices or tiles of pictures 202.

Figure 19A:
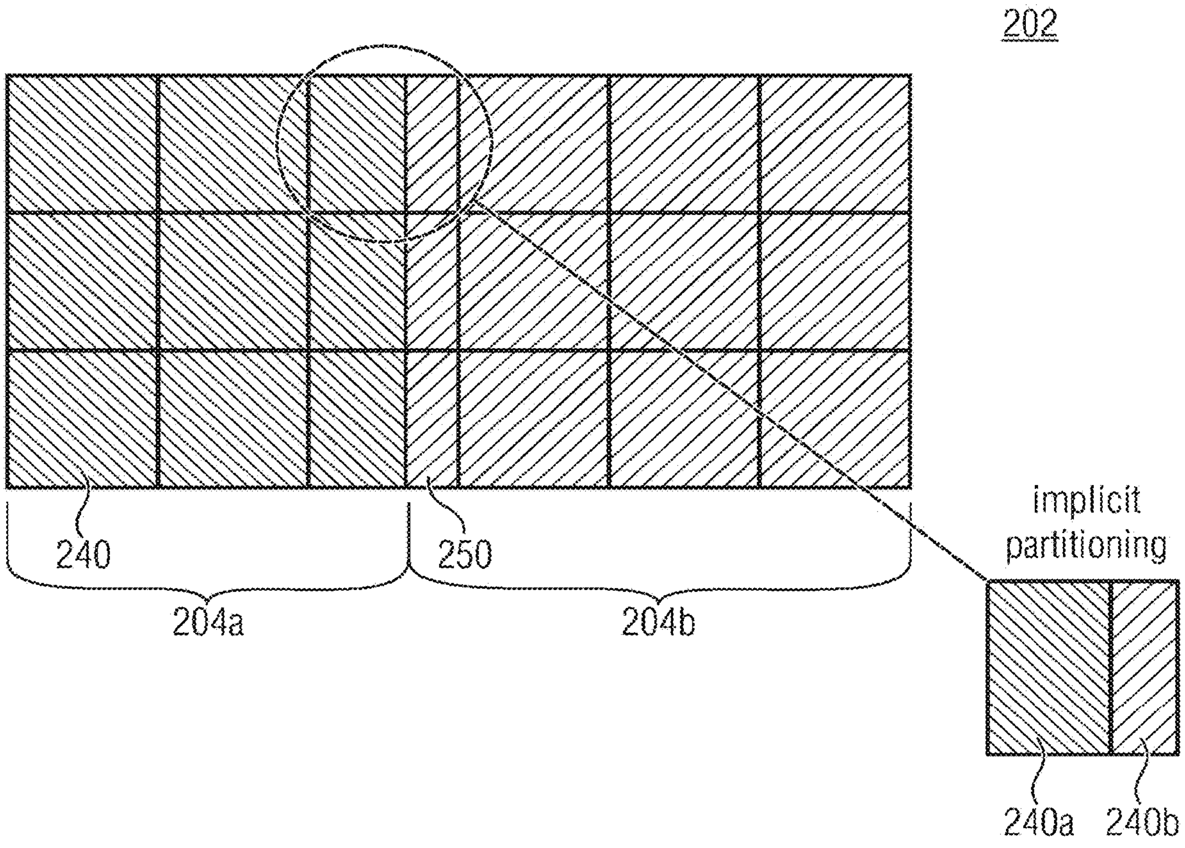
FIGS. 19*a* and 19*b* show schematic diagrams illustrating different possibilities of using the scene partitioning in order to inherently refine the coding partitioning conveyed in the data stream.

Further, video encoder and video decoder may use the scene partitioning 208 or the scene partitioning information 228, respectively, as a source for implicitly defining the coding block partitioning. That is, both video encoder and decoder may partition the pictures 202 into blocks 240 according to the coding partitioning and encode/decode the video in units of these blocks 240. As described, these blocks may be transform blocks, prediction blocks, coding blocks or tiles, just to name a few examples. Both, video encoder and decoder would perform the coding partitioning depending on the scene partitioning 208. Let's illustrate this using the tile partitioning as an example. That is, in accordance with the embodiments just-described, the RWP or scene partitioning information 228 is used in partitioning the picture 202 into blocks 250 or other units of a block-based hybrid video codec that, for instance, uses motion-compensated prediction. E.g., in case a partition into blocks 240 signaled by way of information 228 does not align with boundaries between picture regions 204 defined in the RWP information 228 and the regions 204 neighboring the RWP boundary do have different properties such as different spatial sampling density or different scene resolution, the corresponding block or unit structure might be aligned with the RWP boundary without the need for explicit signaling, i.e., an implicit partition is derived that coincide with a region boundary signaled in the scene partitioning or RWP 228. See, for instance, FIGS. 19*a* and 19*b*. In accordance with FIG. 19*a*, the coding partitioning 242 signals a partitioning of picture 202 into blocks 240. The blocks 240 may, for instance, be tiles. The coding partitioning information 242 would merely indicate, for instance, the size of blocks 240, thereby defining a regular sub-division of picture 202 into an array of blocks 240 of that size. There are blocks 240, however, which cross a border 250 between two different picture regions 204*a* and 204*b*, possibly differing in scene sampling resolution or the like. The boundary 250 is derivable from the bitstream 224 for the decoder 230 on the basis of the scene partition information 228. Encoder 220 and decoder 230, accordingly, split these blocks 240 which cross-border 250, implicitly into two blocks 240*a* and 240*b* along border 250 without the need for explicitly signaling this split into the coding partitioning 242.

Figure 19B:
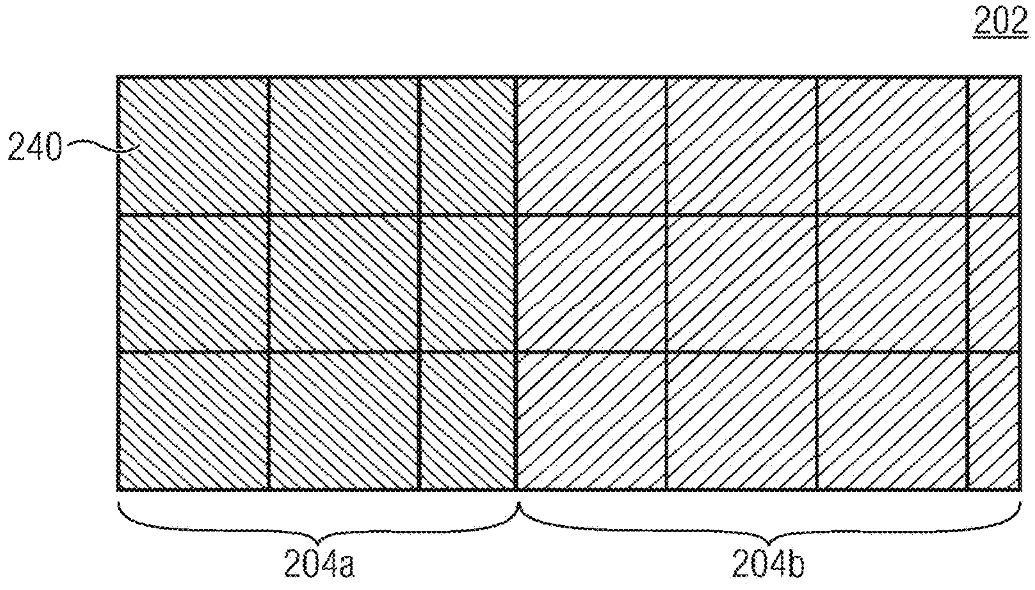

An alternative way of defining the coding partitioning and the coding partitioning information 242 in a manner dependent on the scene partitioning 228 is depicted in FIG. 19*b*. Here, blocks or coding units 240 are aligned to boundaries of picture regions 204*a* and 204*b*. That is, the coding partitioning information 242 may, for instance, merely indicate the size of blocks 240 and video encoder and video decoder sub-divide each picture region 204*a* and 204*b* individually with starting at a certain position along the circumference or boundary of each picture region 240*a* and 240*b* sub-dividing this picture region into blocks 240 of that size such as with starting at the top left corner of the respective region. Blocks 240 extending beyond the boundary of the respective coding region to the right hand side and to the bottom thereof may be cropped accordingly so as to end at the respective boundary. The result is depicted in FIG. 19*b*.

In a manner similar to the regular subdivision into blocks 240, implicit block partitioning may also be applied to hierarchical multi-tree subdivisioning as explained with respect to FIG. 17. Assume, for instance, the leaf block of hierarchical level 1 in FIG. 17 to the right within tree root block 244 would cross a boundary between picture regions. In such a case, the split of this region could be implicit between video encoder and video decoder and this signaling of a respective bit within information 242 could be left off.

Thus, as just mentioned, the usage of RWP information 228 as a source for inferring some splits not explicitly signaled in the coding partitioning 242 may also relate to coding partitionings 242 including an hierarchical multi-tree subdivisioning. This may apply to partitioning blocks into leaf regions completely, but also to hierarchical splitting blocks overlapping with a neighboring region. For instance, in FIG. 19*b*, blocks 240 at the right hand side of region 204*a* would cross border 250. They are cropped. They are handled like regions extending beyond a picture's circumference. If one such block 240 is subject to further multi-tree subdivisioning into further leaf blocks, for each of a subset of split decisions of the multi-tree subdivisioning of a multi-tree subdivisioning of a block crossing border 250, it may be inferred by encoder and decoder whether same is to be executed in which case the corresponding region of the current split level is split, or not to be executed so that the corresponding region subject to the respective split decision is to become a leaf region of the hierarchical multi-tree subdivisioning. The inference is made dependent on the scene partitioning of the predetermined picture without sending a split bit indicator for the respective split decision as part of information 242, namely based on whether the corresponding region of the current split level would, if not being split, cross border 250. For each other split decision of the multi-tree subdivisioning, disjoint to those split decision inferred based on RWP information 228, the respective split decision would be signalized by way of a respective split bit indicator in the data stream as part of information 242. FIG. 19*c* presents a syntax example for a CU quad-tree split by taking the HEVC syntax of the CU splitting as a basis and highlighting those amendments which result from exploiting the RWP tiling: Here, it is assumed that TileId (pixel position) is a function which results into different values for pixels lying in different RWP regions 204*a* and 204*b*, respectively, i.e. at different sides of border 250. The syntax achieves a split of a CTB of region 204*a* which would, if not cropped, cross border 250 in a manner where the CUs, i.e. the leaf blocks, are aligned with the region boundary 250 with sparing signaling split indicators split_cu_flag for splits which may be inferred based on the position of border 250. At 251, for instance, split_cu_flag is not signaled if the current region, subject to a split supposed to be signaled by split_cu_flag, is to be performed anyway as the region would cross border 250. At 251, the hierarchical splitting is skipped for regions completely lying outside the region 204*a* to which the currently hierarchically split block 240 belongs.

Another situation where the scene partitioning 208 may influence the coding/decoding process relates to sub-pel interpolation filters and motion compensation. In accordance with embodiments of the present application, the idea here is to facilitate the sub-pel interpolation filter of block-based hybrid video encoders/decoders to accommodate the potentially differing spatial sampling properties of regions of RWP within the picture during motion compensated prediction whenever the current block subject to motion compensated prediction on the one hand and the area of the reference picture referred to by the motion vector of the current block lie in two differently sampled regions, i.e., picture regions 204 associated with a different scene sampling density/resolution.

Figure 20A:
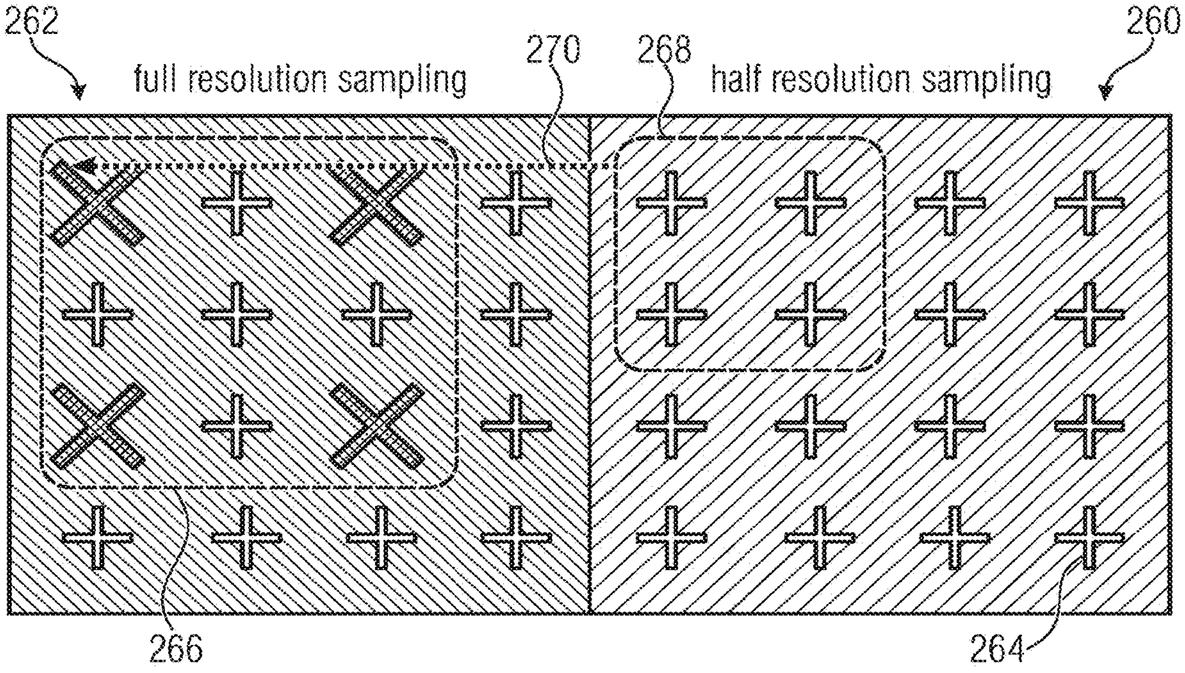
FIG. 20*a* shows a schematic diagram illustrating a current inter-predicted block referring to a portion of a reference picture within a picture region corresponding to double scene sample density/resolution.
Figure 20B:
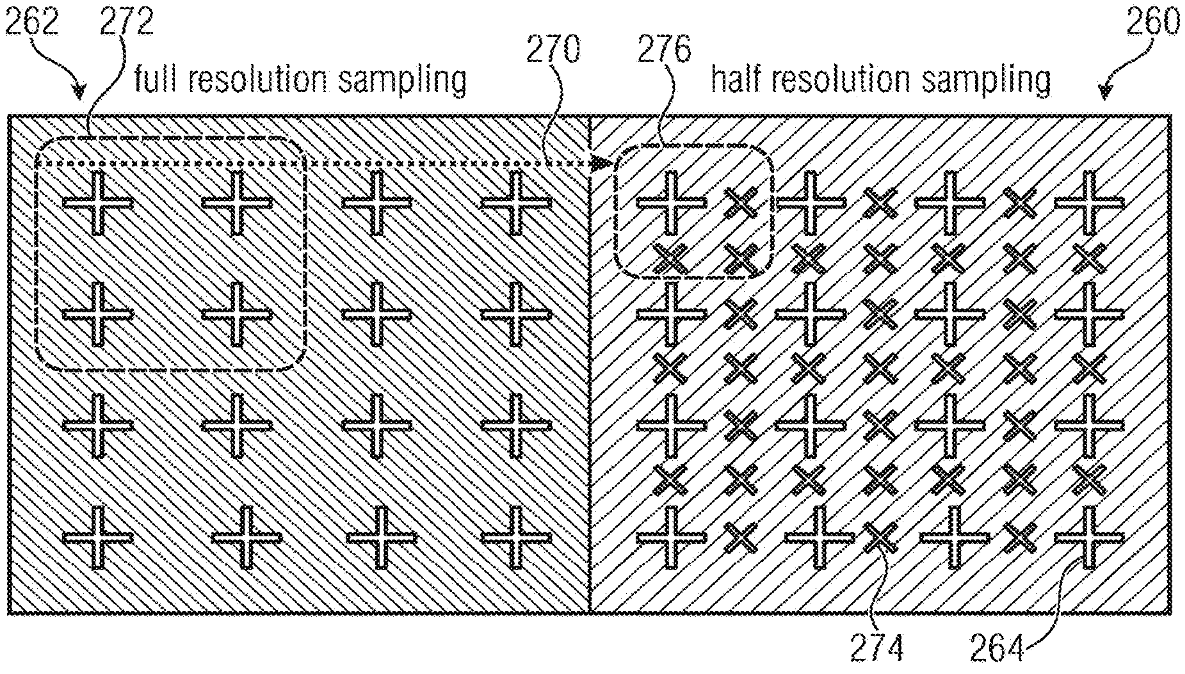
FIG. 20*b* shows a schematic diagram illustrating the opposite situation relative to FIG. 20*a;*

In one embodiment, the following applies a) When downsampling 2:1 (ref to cur)-Part of the full sample positions are to be treated as sub-pel position, or b) When upsampling 1:2 (ref to cur)-Sub-pel interpolation is carried out and resulting samples are to be treated as full-pel samples, or c) Otherwise, no change, regular motion compensated prediction Take for instance the following illustration of a picture in FIGS. 20*a* and 20*b* with two regions (left and right), each 4 by 4 samples but depicting different viewing angle, i.e. the left hand side of the picture depicts image content of a comparatively smaller viewing angle but higher resolution/fidelity.

Take for instance, the following illustration in FIG. 20*a* of an area 260 out of a picture region 204 of a current picture 202 on the right hand side, and a picture area 262 out of a picture region 204 of a reference picture. The depicted areas 260 and 262 are both 4×4 coded samples wide, the coded samples indicated by crosses 264. Owing to different scene sampling density/resolution, areas 260 and 262 pertain to different viewing angle. To be more precise, although both areas 260 and 262 are composed of the same number of coded samples, the left hand area 262 depicts image content of a comparatively smaller viewing angle, but higher resolution/fidelity than the right hand area 260 with the ratio being to 2:1.

All full-pel sample positions or coded sample positions are depicted as crosses in the figure. It is clear that a 2×2 subset 266 of the left hand side samples, namely the samples at positions marked with dotted rotated crosses, corresponds to a version of the region at the lower sampling resolution, i.e. these 2×2 samples on the left hand side indicated by 268 depict the same viewing angle at the 4×4 samples at the right hand side.

In this example, for case a), the dashed rectangle 268 on the right illustrates the current block with a motion vector 270 pointing to a sample position at the left hand side. Part of the coded full-pel positions are treated as half-pel positions in this case and only a subset (the rotated, dashed crosses) are considered for the reference (again encircled by a red dashed rectangle 266).

Vice versa, in case b), as illustrated in the following FIG. 20*b*, when the current block is located on the left hand side as marked through a red dashed rectangle 272 and the reference block is located at the right hand side at comparatively lower sampling (1:2) the sub-pel sample positions (indicated through rotated crosses 276) are treated as full-sample positions for the reference and the copied portion as indicated by 276.

Note that in FIG. 20*b*, the area 260 is an area out of the reference picture and area 262 is an area out of the current picture the scene sampling density/resolution of the picture region area 260 is located in being lower than the one of the picture region 204 the picture area 262 is located in. In other words, the existing samples at high resolution, i.e., the crosses 264 at the left hand side, e.g., if resolution ratio is 1:2, can be used and considered as sub-pel for the low-resolution block 276. For instance, in the case that the resolution ratio of the blocks is 1:2, every second sample in the high-resolution block 272 could be skipped if the motion vector would point to an integer sample position considering low resolution. Each of these skipped samples of the high-resolution block would correspond to half-pel samples if low resolution is considered.

Figure 21:
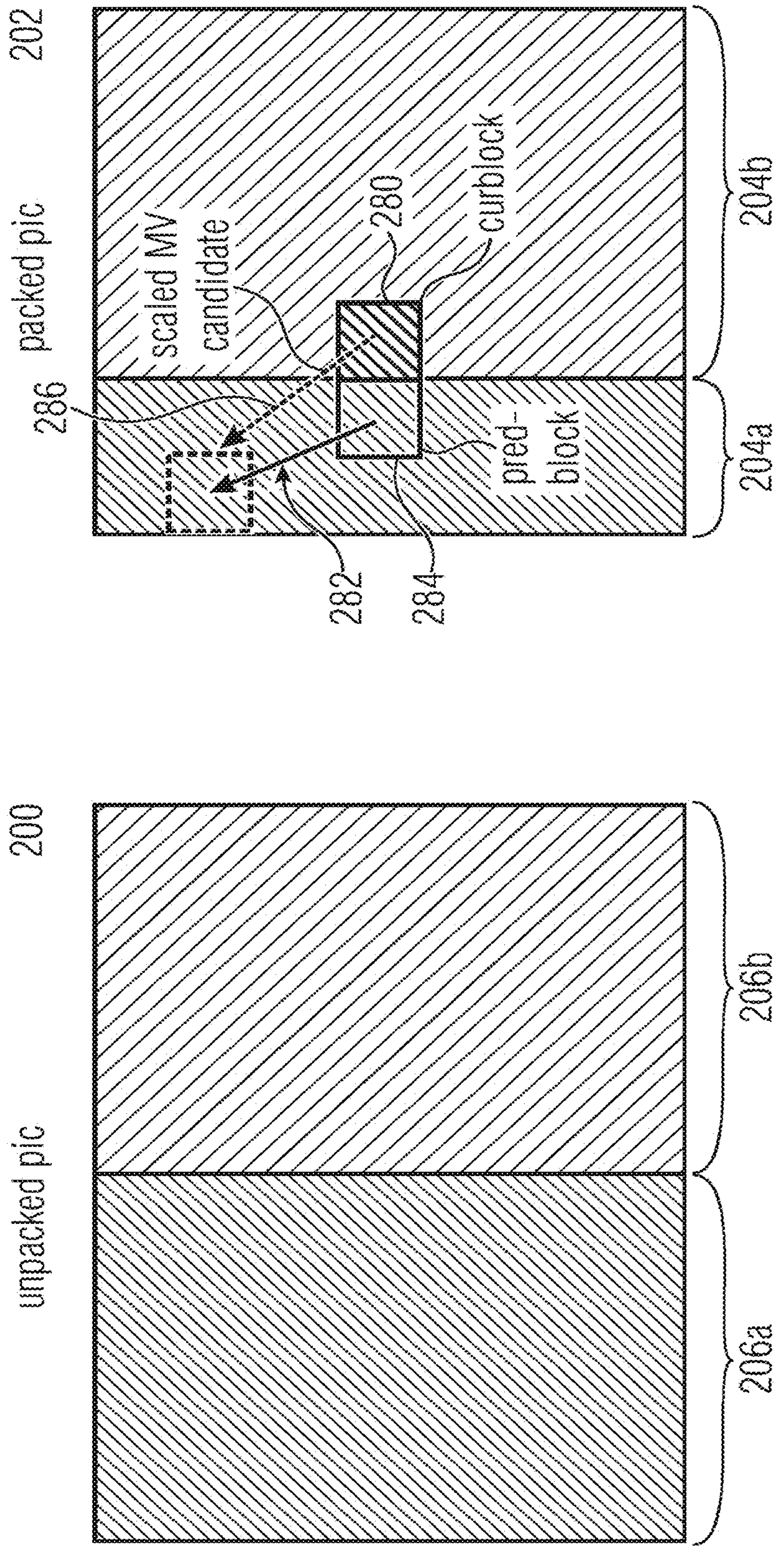
FIG. 21 shows a schematic diagram illustrating a current inter-predicted block and the derivation of a motion vector predictor for this block on the basis of a neighboring block residing in a neighboring picture region of different scene sampling density/resolution.

In accordance with a further embodiment, motion vector predictors may be scaled in encoder and decoder based on properties of the regions within the packed picture 202 that contain the current block for which the motion vector is to be predicted, and the predictor block which forms the source for a certain motion vector predictor. For instance, FIG. 21 illustrates a packed picture 202 with two picture regions 204*a* and 204*b* wherein the left region 204*a* is exemplarily horizontally down scaled with respect to the unpacked picture which is shown in FIG. 21 using the reference sign 200 at the left hand side sub-divided into a scene region 206*a* corresponding to picture region 204*a* and scene region 206 corresponding to picture region 204*b*. When coding the dashed block 280 using inter-prediction, with block 280 being positioned in picture region 204*b*, the exemplary motion vector candidate 282, namely the motion vector used for coding the neighboring block 284 which is located in picture region 204*a*, is scaled according to the resampling that its picture region 204 underwent before encoding or, to be more precise, according to the scene sampling resolution difference between picture regions 204*a* and 204*b*, respectively. In the concrete example, the horizontal component of the motion vector 282 would be increased according to the difference in the scene sampling resolution and then be used as a motion vector candidate 286 for the current block 280. The used candidate 286 would, thus, represent a scaled version of the motion vector 282 of the neighboring block 284.

Figure 22:
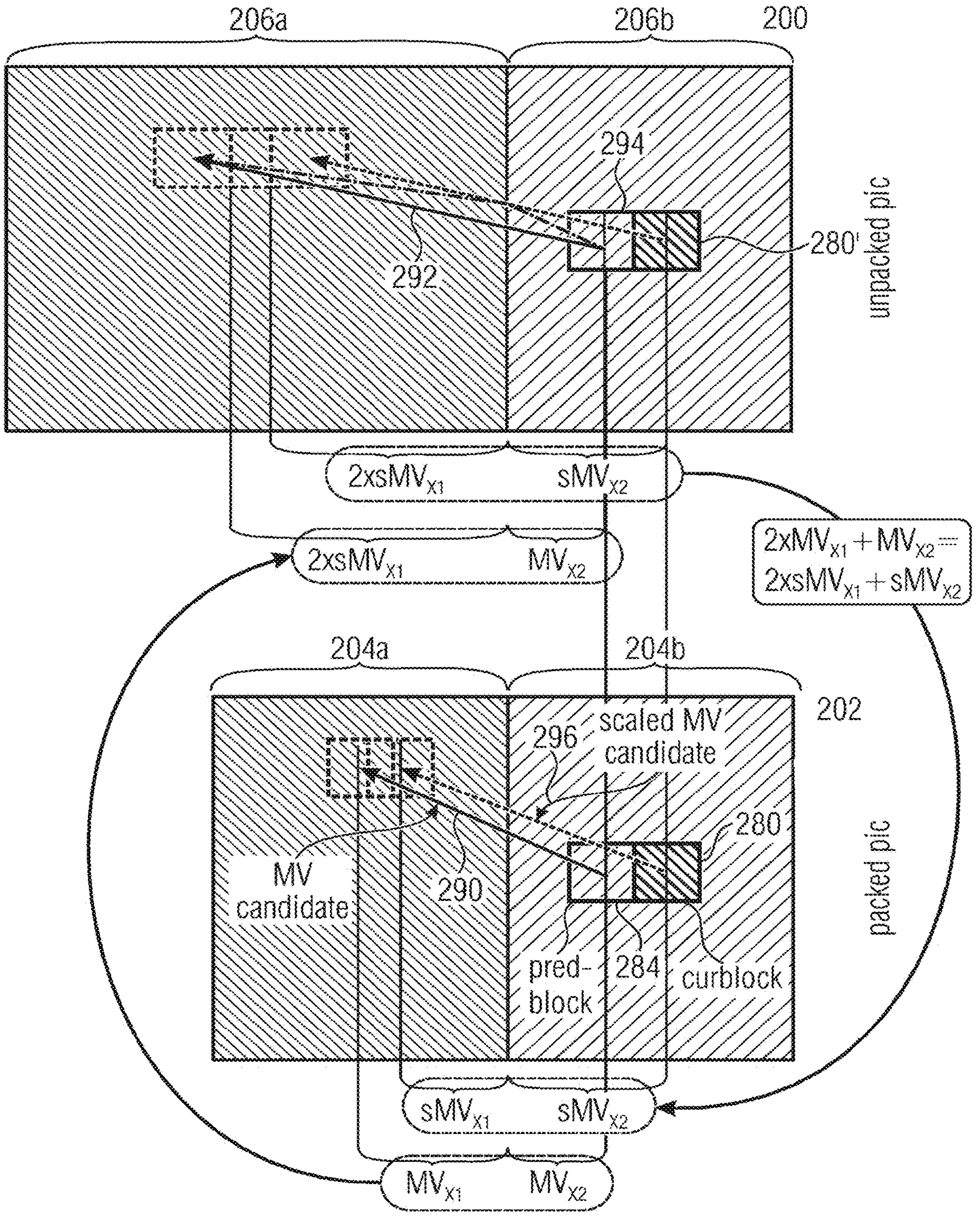
FIG. 22 shows a schematic diagram illustrating the scaling of a motion vector predictor derived from a neighboring block both residing in the same picture region, the motion vector of the neighboring block, however, pointing to a picture region of a different scene sampling resolution/density.

The following FIG. 22 illustrates how the scaling is carried out for two blocks 280, 284 belonging to the high-resolution region 204*b*. Note that it is assumed that the low resolution region 204*a* of the picture 202 is assumed to be downsampled only in the horizontal domain by a scaling factor of 1:2.

The scaling of predictors in the packed picture domain is a result of considering MV predictors in the unpacked domain 200. In FIG. 22, it is shown how the predictor MV (in the packed picture 290) is mapped to another vector 292 in the unpacked picture 200.

More concretely, in the given example, we'll focus on its horizontal component $MV_x$ as the vertical component is not subject to any scaling from RWP 208. The horizontal component $MV_x$ is split into two portions, namely $MV_{x_1}$(part of the motion vector 290 that lies in the low resolution region 204*a*) and $MV_{x_2}$(part of the motion vector 290 that lies in the high resolution region 204*b*), it results into $2xMV_{x_1}+MV_{x_2}$ horizontal component in the unpacked domain 200 (assuming a 1:2 downsampling factor for the low resolution region). The predictor 294 in the unpacked domain with the horizontal component $2xMV_{x_1}+MV_{x_2}$ is the one that is used for the current block 280, the image of which in unpacked domain 200 is indicated at 280'. This predictor 294 at the same time needs to be converted back to the packed domain thereby yielding predictor vector 296. However, this motion vector 296 for the current block has two different parts belonging to the different resolution regions 206*a*, 206*b*, namely $2xsMV_{x_1}$ and $sMV_{x_2}$ (where as discussed are the same in the unpacked domain 200, i.e. $2xMV_{x_1}+MV_{x_2}=2xsMV_{x_1}+sMV_{x_2}$). This results in a scaled motion vector 296 in the packed domain 202 with a horizontal component equal to $sMV_{x_1}+SMV_{x_2}$.

The listed motion vector components (and parts) can be computed relative to the position of the center of the block and position of the region. E.g., in the example considered above (with MV having a positive sign toward the left)

$$MV_{x2} = Blockcenter - RegionBoundary$$

$$MV_{x1} = MV_x - MV_{x2}$$

$$sMV_{x2} = Blockcenter - RegionBoundary \text{ (in the unpacked domain)}$$

$$2\times MV_{x1} = 2\times MV_{x1} + MV_{x2} - sMV_{x2}$$

Figure 23:
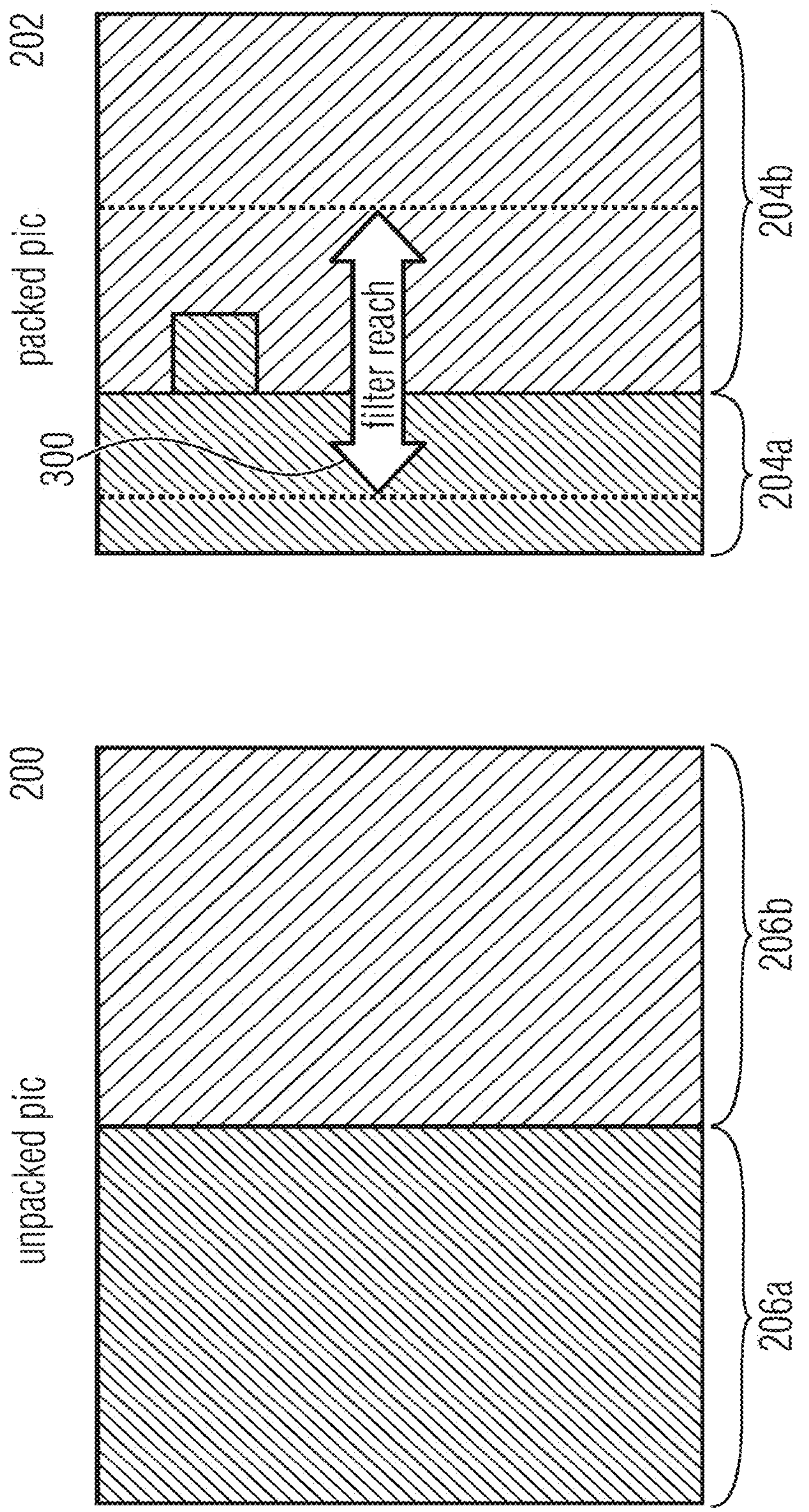
FIG. 23 shows a schematic diagram illustrating the application of a filter crossing picture regions of different scene sampling resolution/density.

A further embodiment of a possible dependency of the coding/decoding of the encoders and decoders of FIGS. 15*a* and 15*b* pertains filtering parameters. In state of the art video codecs such as HEVC or AVC, parameters of the filter such as post filter or in-loop filter or deblocking filter, can be derived based on properties of neighboring blocks to be filtered. The filter parameter may pertain to, for instance, filter strength, a transfer function of the filter, a filter kernel size or a deblocking filter reach. The properties based on which such a filter parameter is determined on encoder and decoder side can be, for instance a prediction mode such as intra or inter, block size or the like. If different resolution content is mixed within a picture 202 before encoding no special care is taken in an in-loop deblocking filtering step, for instance, this might lead to visual artifacts along the boundary between two such differently sampled regions such as between two differently sampled picture regions 204*a* and 204*b* depicted in FIG. 23. This is due to the fact that between decoded and presentation on a display, the two regions 204*a* and 204*b* may be resampled to have equal resolution, i.e., samples per degree, and the samples altered by the filter within both regions 204*a* and 204*b*, i.e., samples within the filter reach 300 may occupy different amounts of degrees and field of view. In order to prevent visual artifacts in such cases, in accordance with an embodiment, the strength of such a filter or further filter parameters such as filter reach 300, i.e., number of samples from the filtering boundary regarded/altered by the filtering process is modified depending on the resolution of neighboring picture regions 204*a* and 204*b* with respect to each other. This is depicted in FIG. 23.

In accordance with a further embodiment, the dependency of the encoding/decoding process on the scene partition 208 pertains, for instance, the reference sample derivation for a filtering process such as an in-loop deblocking filtering process.

When regions within the picture are packed (e.g. different horizontal and vertical resampling are used across regions and regions are the re-arranged to derive a rectangular picture plane), neighboring samples in the packed picture may not be neighboring in the unpacked picture. Therefore, it is undesirable to naively filter over boundaries with such properties. Instead, as part of the invention, the RWP information is used to derive the samples in the packed picture that have neighboring relationship in the unpacked picture and use these samples for the filtering process.

See, for instance, FIG. 14*b*. Here, the interface between picture regions 204*c* and 204*b* is an artificial or scene-discontinuous interface. That is, the portions of the picture regions 204*c* and 204*b* abutting each other at this interface 310 in the packed domain or within picture 202 do not abut each other in this scene 200. Accordingly, it would be feasible to disrupt or avoid filtering across this interface 310 at all. However, in accordance with an alternative, according to the just-outlined embodiment, encoder and decoder fill a filter kernel of a respective filter extending beyond this interface 310 from a currently filtered picture region to the neighboring one such as from picture region 204*c* to picture region 204*d* with samples obtained from a portion of picture 202 which abuts the currently filtered picture region at that interface 310 in the scene 200 such as the left hand edge side of picture region 204*a* in case of the just-outlined example. In the example of FIG. 14*b*, if the picture region 204*b* is currently filtered and the filter kernel extends beyond interface 310, it could be filled by use of the right hand edge portion of picture region 204*a* as can be seen by looking at the scene domain 200.

In accordance with another embodiment, video encoder and decoder show a scene partition dependency with respect to encoding and decoding as far as quantization is concerned.

When the residual signal of a motion compensation predicted picture in a video codec is transformed, floating point transform coefficients typically undergo a lossy quantization on encoder side. Apart from uniform quantization depending on a given step size (quantization parameter or QP), state-of-the-art codecs allow to alter quantization towards non-uniformity, e.g. by incorporating a scaling factor into quantization depending on the transform coefficient base frequency. This allows to implement subjectively optimized encoding schemes. While such scaling lists can be known on decoder side a priori and activated and indexed by bitstream signalling, it is also possible to transmit custom scaling lists per picture in a bitstream.

Figures 24A, 24B:
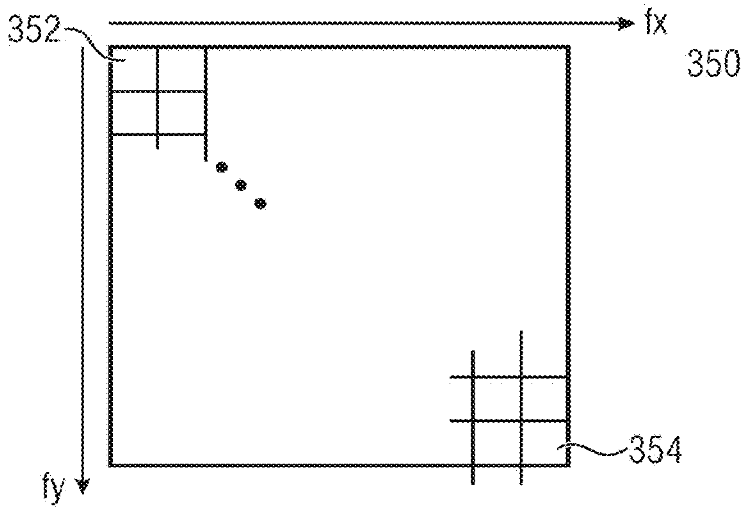
FIG. 24*a* shows a syntax example for a syntax signaling different quantization parameters controlling a noise colorness for sake of varying this quantization parameter within a picture and within the picture regions, respectively.
FIG. 24*b* shows a schematic diagram of a transform block such as a prediction residual transform block in order to illustrate of how the quantization parameter of FIG. 24*a* may influence the noise colorness.

When regions within the packed picture depict content with varying characteristics, coding efficiency gains can be achieved by tailoring the scaling lists to the characteristics of the region. For instance, these characteristics may include resolution/sampling but also nature of content and so on. Hence, it is feasible to signal these tailored scaling lists on a per picture region 204 basis. The FIG. 24*a* shows one embodiment, where scaling_list_data( )[i] is the syntax structure that, amongst others, carries the coefficients of the scaling list for the i-th region.

Individual areas or regions 204 within a coded picture 202 can subsequently reference one of the scaling lists signaled, e.g. per index into the list scaling_list_data( )[i] from slice header or picture parameter set. Alternatively, num_scaling_lists_areas_minus1 could be equal to the number of regions within RWP, signaling a scaling list for each individual region implicitly.

That is, in accordance with the just-outlined embodiment, video encoder and decoder of FIGS. 15*a* and 15*b* allow for a sub-picture wise setting and, in particular, a picture region 204 wise setting of the quantization parameters. The quantization parameter controls a spectral shape of a spatial frequency spectrum of a quantization noise of the quantization. For instance, see FIG. 24*b*. FIG. 24*b* shows a transform block 350 as it may be coded by the video encoder 220 into data stream 224 in order to encode one block out of the prediction residual. The transform block 350 has been obtained by the video encoder using some transformation which spectrally decomposes the corresponding residual prediction block in x and y. The prediction coefficients of transform block 350 correspond to different horizontal frequencies $f_x$ and vertical frequencies $f_y$. For instance, at the top left corner, the DC transform coefficient value is and at the bottom right hand corner the highest frequency component in x and y is located with both being indicated at 352 and 354, respectively. The quantization parameter just-discussed which might be coded into the data stream 224 in a manner so that it may vary among the picture regions 204 within one picture 202 controls the spectral shape of the spatial frequency spectrum of the quantization noise, for instance, by controlling the quantization step size to be used for quantizing and dequantizing the transform coefficients of the transform 350 in a non-uniform manner. That is, instead of scaling the quantization step size for quantizing the transform coefficients of transform 350 equally for all transform coefficients of transform 350, the quantization parameter discussed herein differently varies the quantization step size to be applied in quantizing and dequantizing the transform coefficients of transform 350. Such scaling can be implemented by transform coefficient scaling before quantization while maintaining an uniform quantization step size. For instance, the quantization parameter determines a tilt or otherwise spectral variation of the quantization step size to be used for the transform coefficients of transform 350.

That is, in other words, the encoder and decoder 15*a* and 15*b* may allow for a quantization and dequantization which has a coarseness which varies spectrally, i.e., varies over the transform coefficients 352 of transform 350 so that, in turn, the quantization noise also spectrally varies. The variation of the quantization noise over the spatial frequencies $f_x$ and $f_y$ may be done by scaling the transform coefficients 352 prior to quantization and inversely scaling the quantized transform coefficients at the decoder side. To be even more precise, the at least one quantization parameter which may be varied by the encoder for different regions of a picture, may define a scaling factor for each transform coefficient 352 of transform 350. These scale factors define a non-uniform spectral shape. Per region, the at least one quantization parameter may, for instance, indicate a scale factor per transform coefficients 353 individually, or a scale factor for different spectral regions transform 350 is sub-divided into, such as sub-blocks of transform 350 into which transform 350 is sub-divided in rows and columns or differently sized sub-blocks. Alternatively, the at least one quantization parameter may determine the spectral shape defined by the scale factors according to a parametrized two-dimensional function defining the course of the scale factors over the transform coefficients 352. The encoder would, for instance, divide each transform coefficient 352 by the respective scale factor prior to quantization using a uniform quantization function, i.e., a quantization function being equal for all transform coefficients 352 of a transform 350. The decoder would receive the quantization parameter for each region and, accordingly, the resulting scale factors for each transform coefficient 352 and scale the received quantized transform coefficients 352 by multiplying the respective transform coefficients 352 with a received scale factor, thereby shaping the quantization noise spectrally according to the received quantization parameter, namely individually for each region of a current picture individually.

Before proceeding with another aspect of the present application and describing embodiments with respect to this aspect, it should be noted that the just-mentioned possibility of varying the quantization parameter varying the spectral shape of the spatial frequency spectrum of the quantization noise over the picture may also be used independently from the scene partition dependency of encoding and decoding as discussed so far with respect to FIGS. 15*a* and 15*b*. Thus, FIGS. 15*a* and 15*b* may pertain to examples of encoder and decoder and enabling a sub-picture wise setting of the just-mentioned quantization parameter irrespective of the pictures 202 of the coded video sequence having underwent any scene partitioning or not and whether data stream 224 comprises a scene partitioning description 228 or not. The data stream 224 would, however, in any case comprise an information such as 360 in FIG. 24*a* on a sub-picture wise variation of the quantization parameter by way of which the spectral shape of the quantization noise is varied as just outlined. In this regard, it should be noted that there exists also other possibilities of influencing the noise colorness than those explained with respect to FIG. 24*b*.

Figure 25A:
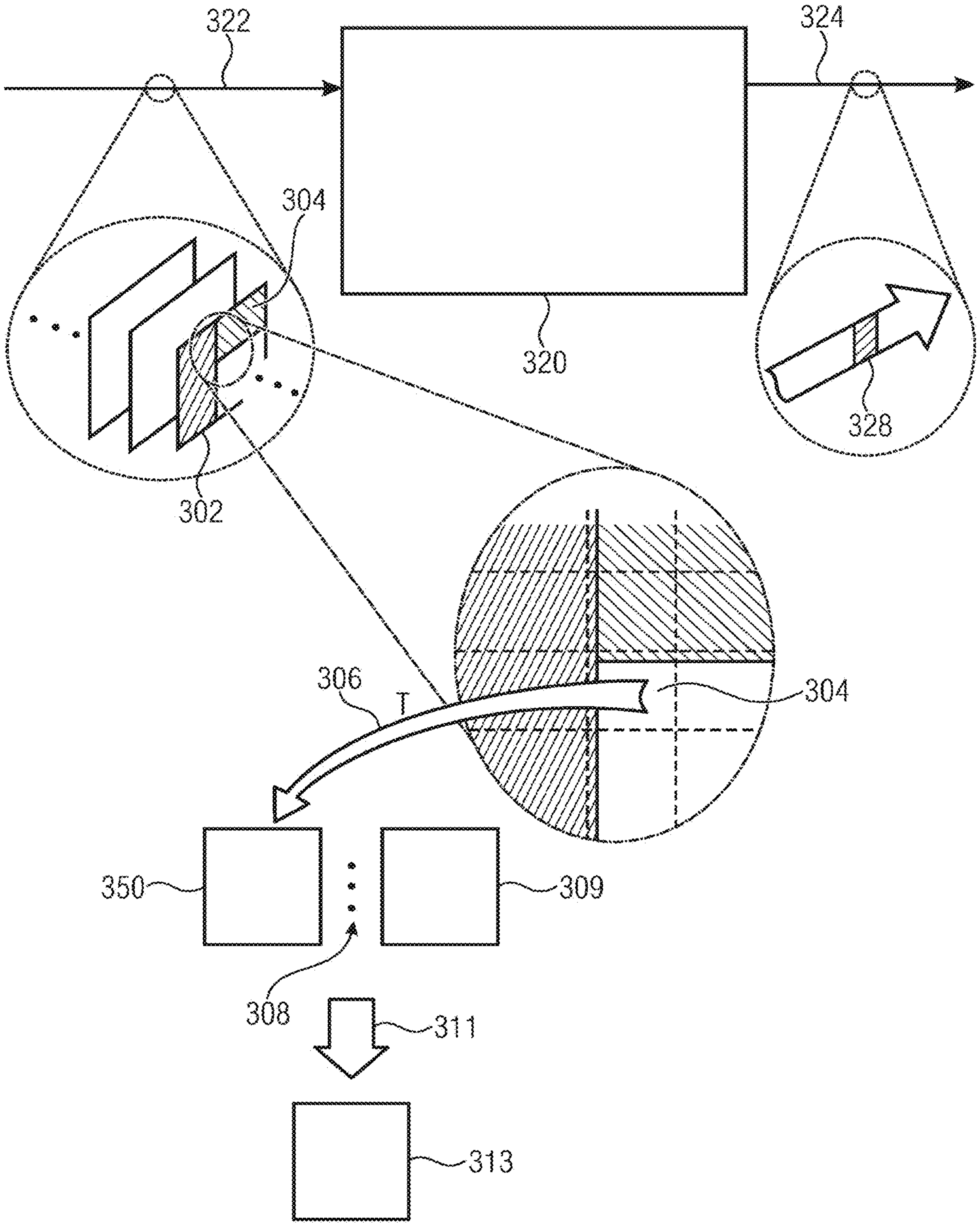
FIG. 25*a* shows a schematic block diagram illustrating an encoder, possible a video encoder, in accordance with an embodiment where the encoder locally varies a quantization parameter which influences the noise colorness within the coded picture.
Figure 25B:
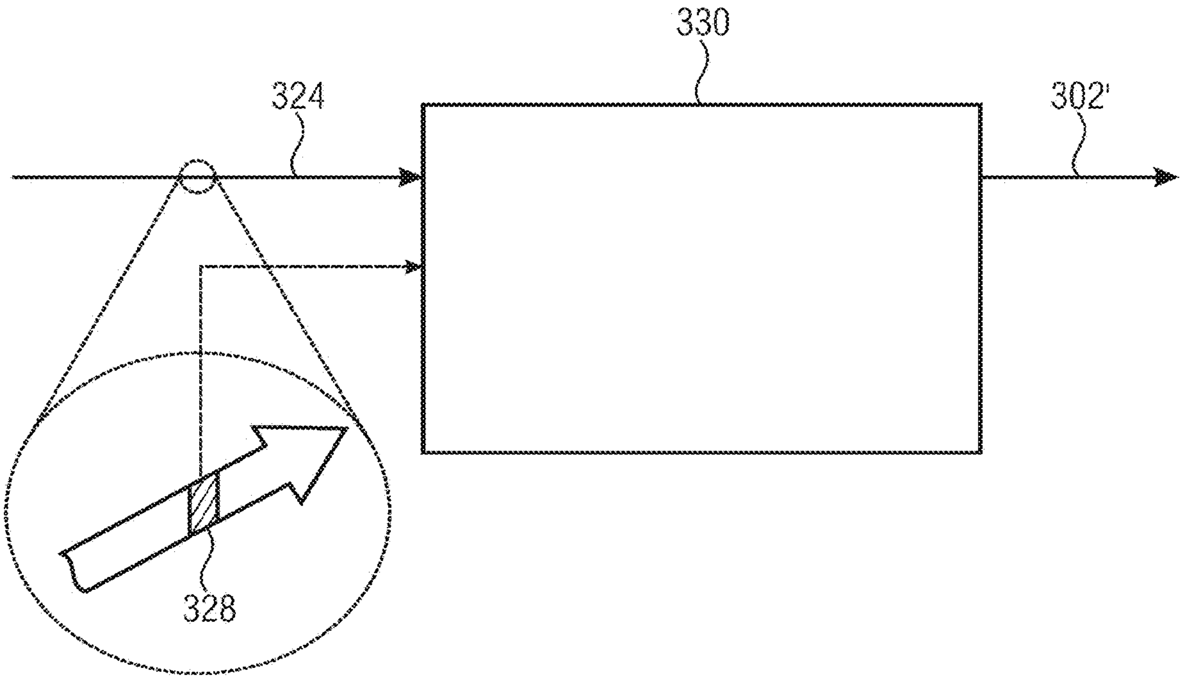
FIG. 25*b* shows a schematic block diagram of a decoder fitting to the encoder of FIG. 25*a;*

The latter circumstance is described in more detail with respect to FIGS. 25*a* and 25*b* which show an encoder and a decoder, respectively. The encoder of FIG. 25*a* may be a video encoder but is not necessarily. The encoder of FIG. 25*a* which is indicated using reference sign 320 receives a picture 302 which might be a picture of a video 322 or not and encodes the picture 302 into data stream 324 using transform based predictive coding. That is, encoder 320 may predict blocks of picture 302 using one or more prediction modes such as spatial prediction modes and, in case of video coding, temporal predictions modes and encode the prediction residual using transform coding. To this end, encoder 320 may sub-divide picture 302 into transform blocks, i.e., blocks 304, which the encoder 320 then subjects to transformation 306 to yield a transform block 350, respectively. For quantization, the encoder 320 inversely scales this transform 350 using the aforementioned spectral shape 309 defined by the aforementioned scale factors and then subjects the result to quantization 311 in order to yield quantized transform coefficients or a quantized transform 313 for each transform block 304. The quantization function used at step 311 may be transform coefficient invariant, i.e., uniform over the transform coefficient positions, while the scale factors defining the spectral shape 309 vary over the transform coefficients within transform 350 and are defined by way of the aforementioned at least one quantization parameter. The encoder 320 varies, however, this at least one quantization parameter within picture 302 in sub-regions of picture 302, such as sub-regions 304. In data stream 324, the encoder 320 signals the quantization parameter 328 which defines the spectral shape 309 for each sub-region 304. That is, information 328 defines the spectral shape 309 for each sub-region 304 so that a different spectral shape is used for transform blocks 304 within one sub-region 304 compared to transform blocks 304 within another sub-region of the same picture 302. The encoder 320 may decide on the setting of the quantization parameter 328 per region 304 as part of a rate control and/or a cost minimization. Alternatively, encoder 320 may set the quantization parameter 328 in accordance with some other partitioning of picture 302 such as, for instance, according to a partitioning of picture 302 into regions of different spatial resolution at which picture 302 is coded for which example reference is made to the subsequent figures, especially FIG. 28, or regions forming different RWP regions as discussed with respect to FIGS. 24*a* and 24*b*. In that case, the signalization of such other partitioning may concurrently signal the partitioning of picture 302 into region 304 and, optionally, the setting of the quantization parameter per region 304 may also be inferred from other settings for regions 304 such as, for instance, the target spatial resolution at which the respective portion of picture 302, i.e., the respective region 304, is coded into data stream 324.

FIG. 25*b* shows a decoder 330 fitting to the encoder 320 of FIG. 25*a*. It is configured to receive the data stream 324 and to reconstruct the picture 302' therefrom. To this end, the decoder uses transform based decoding, the subdivision of picture 302 into transform blocks 304, the subdivision of picture 302 into regions 304 and uses the quantization parameter information 328 in data stream 324 in order to use the same quantization parameter for each region in dequantization. That is, the decoder 330 retrieves the quantized transform coefficients of transforms 313 from data stream 322, scales them using the spectral shape 309 determined by the quantization parameter for the respective region 304, the corresponding block 304 of the respective transform 313 is located in, and performs an inverse transform to spatial domain for reconstruction purposes.

As already described, the spectral variation of the quantization coarseness may be controlled in another manner than combining a spectral uniform quantizer and a spectrally varying scaling. The quantization parameter may be embodied by a list of scale factors relating to different portions of a transform 350 or may define the spectral shape 309 in anther manner such as using a parameterized function. Further, it should be noted that encoder and decoder may not be transform based coders. That is, they may encode the picture 302 into data stream 324 in a different manner than in form of quantized transform coefficients. The quantization may, for instance, take place in spatial domain, instead. Further, a sub-band decomposition may be used as well.

Picture 302 may be used instead.

Further, as has also been already described above, the spectral shape 309 needs not to be transmitted in the data stream anew. Rather, it may be set in a default manner for encoder and decoder with the quantization parameter merely indicating the usage of this predefined quantization parameter. For instance, for some regions 304, the usage of the default quantization parameter may be indicated to be active, while for transform blocks within a region 304 for which the quantization parameter indicates non-activity, a spectral uniform scaling is used, i.e., the quantization noise is spectrally flat. In even further embodiments, several spectrally varying spectral shapes 309 may be pre-set or represent default settings at encoder and decoder where the quantization parameter indicating for each region 304 as to which of the default quantization parameter settings for defining the spectral shape 309 is used. And even mixtures thereof are feasible: for some regions 304, the quantization parameter may define the spectral shape 309 explicitly in the data stream 324 without indexing any predefined default setting. In the latter case, the quantization parameter may then define spectral shape according to a manner which is determined by the encoder according to some cost minimization, for instance, and/or in a manner involved in the rate control, for instance.

With respect to FIGS. 1*a* and 1*b*, it has been described the possibility that a video encoder and video decoder allow for a temporal variation of a target spatial resolution at which a video is coded. According to the embodiments described herein after, it is possible to allow for a sub-picture resolution at which a certain video is coded. In accordance with an embodiment, the sub-picture characteristic pertains the prediction residual coding. For example, similar to the codec system with the full-picture resampling according to variant b) discussed with regard to FIGS. 1*a* and 1*b* (reconstructed picture resampling), it is conceivable to implement a system as depicted in FIG. 5*a* on sub picture basis. In such a system, regions on each picture are depicted at varying resolution with regard to each other. After reconstruction, the images are resampled to an equal sampling density.

Likewise, it is conceivable to implement a system based on variant c) discussed with regard to FIGS. 1*a* and 1*b* (residual signal resampling) as depicted in FIG. 5*b* where the resampling is carried out selectively on sub picture basis. In such a system, the residual signal in resampling on a per-subpicture basis, e.g. per CTU, tile, slice or otherwise defined region (RWP). For reconstruction of the coded picture, the residual signal is resampled back to full resolution. Hence, the DBP 22/36 is filled with pictures of the reference spatial resolution while motion compensation and in-loop filter occur at full resolution as well. In such a system, the resampling of residual signals is a normative part of the codec and hence, filter parameters and sizes of sample arrays before/after resampling should be clearly specified, e.g. relative to the CTU size.

Figure 26:
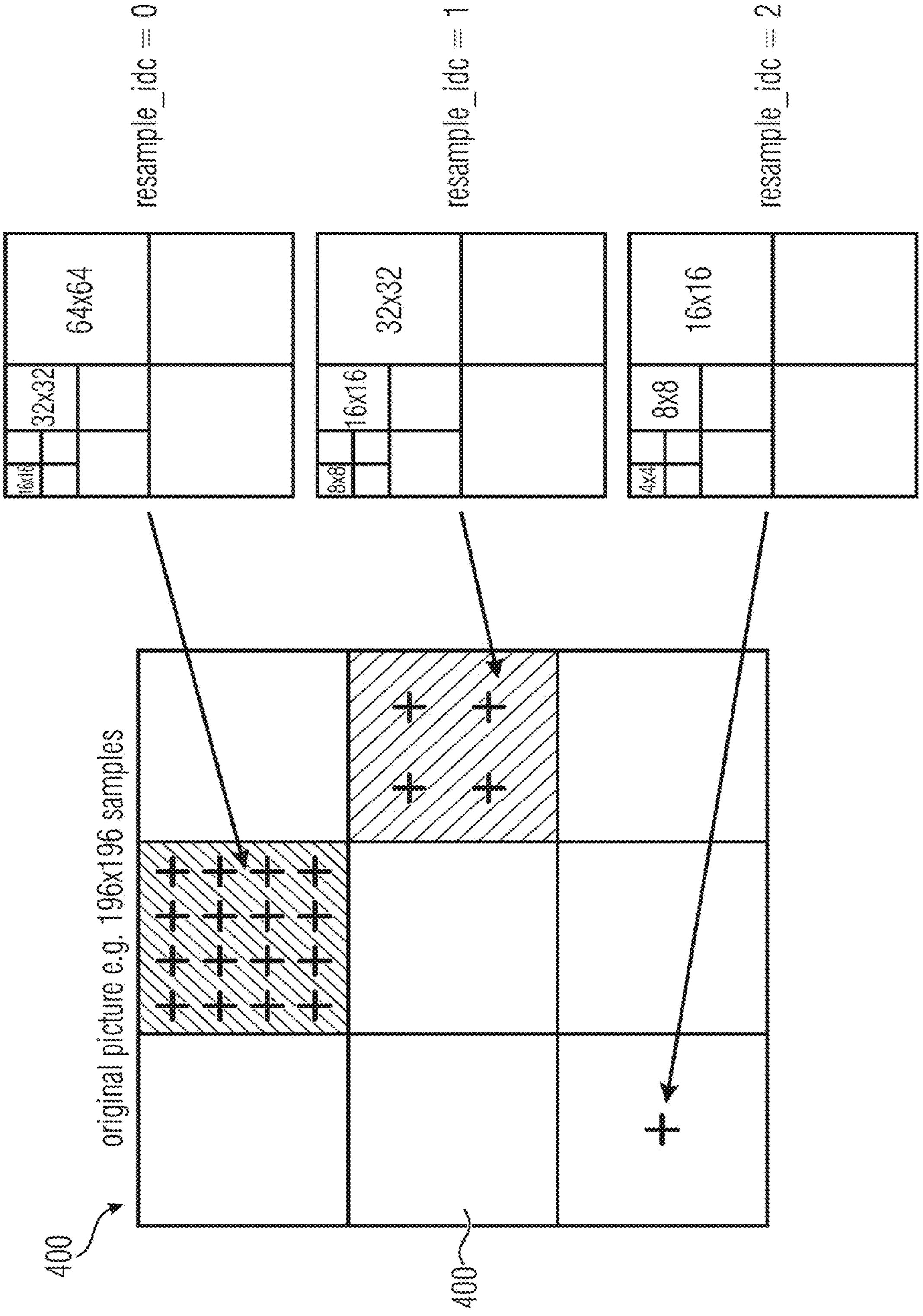
FIG. 26 shows a schematic diagram illustrating a coded picture and the variants of target spatial resolution within sub-regions thereof.

The FIG. 26 illustrates the coded picture 400 within such a system, where residual resampling is carried out an CTU basis i.e., in units of CTUs 402. Hence, the block structure carrying the residual signal samples and the number of resulting samples is adjusted according to explicit signaling (resample_idc).

The syntax element resample_idc could be signaled per individual CTU 402 or in a consolidated fashion per larger group of CTUs such as slices or tiles or RWP regions. The syntax table in FIG. 27 gives an example of a per region signaling variant.

Likewise, exact subpicture filter parameters such as the filter kernel need to be known an encoder and decoder side to ensure avoidance of drift between the two. As characteristics of sub picture may differ widely across the picture plane and different contents, it is advisable to allow for signaling of region-specific filter parameters. Signaling that carries filter parameters such as a kernel with association to a picture region could be derivable.

Figure 28:
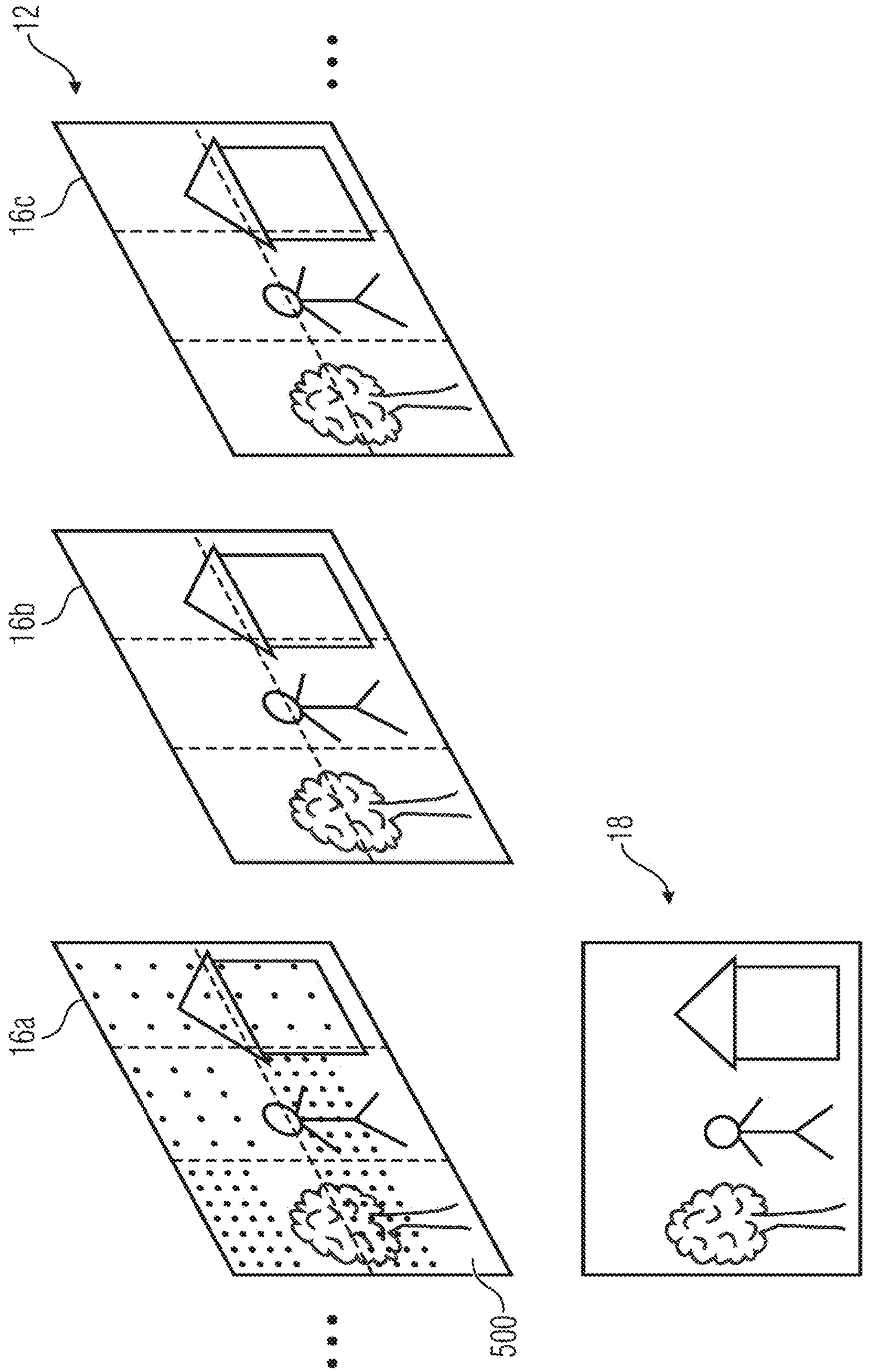
FIG. 28 shows a schematic diagram illustrating the variation of the target spatial resolution in case of implementing or modifying the video encoder and decoder of FIGS. 1*a* and 1*b* to operate at spatially varying target spatial resolution with or without temporal target spatial resolution change as discussed with respect to FIG. 2*a;*

Thus, an embodiment in accordance with the just-outlined aspect could be a video encoder according to FIG. 1*a* and a video decoder according to FIG. 1*b* where the pictures of the video are encoded/decoded in a manner where the encoding/decoding is done at a target spatial resolution wherein this target spatial resolution varies in units of picture regions the pictures are sub-divided into. FIG. 28 illustrates, for instance, that the pictures 16*a* to 16*c* of video 12 are sub-divided into picture regions 500 and illustrates by dots exemplarily with respect to picture 16*a* that a different target spatial resolution is chosen for these regions 500. The variation is signaled in the data stream such as using the syntax shown in FIG. 27. Internally, the decoded picture buffer 22 and 36 of encoder and decoder, respectively, may buffer the pictures of the video at a reference spatial resolution such as the original spatial resolution of video 12 or some other spatial resolution as it has been discussed above with respect to FIGS. 1*a* and 1*b*. The variation of the target spatial resolution in spatial terms may, thus, relate to the prediction residual coding. Internally, video encoder and video decoder may operate according to variant b or variant c discussed above. As already denoted above, the embodiments described with respect to FIGS. 1*a* and 1*b* and 26 to 28 ay be combined with the above embodiments. Accordingly, the description of FIGS. 1*a* and 1*b* as further specified in FIGS. 2*a* to 14 shall also be applicable to the just outlined embodiments such as far as the internal structure of encoder and encoder is concerned. Further, the varying quantization parameter functionality and the varying filter functionality of FIGS. 15*a* to 24*b* may be used in the encoder and decoders according to the just-outlined embodiments as well.

As discussed with respect to FIGS. 26 to 28, it is possible to implement encoder 10 and decoder 30 of FIGS. 1*a* and 1*b* in a manner so that in some rate-distortion optimization in the encoder 10, the target spatial resolution would be determined per CTU or prediction unit each picture is subdivided into. Encoder and decoder would perform, per CTU or per prediction unit or per some other picture block, a resampling or at least for those not having the reference spatial resolution as described with respect to variants b and c with respect to FIGS. 4*b* and 5*b*, respectively. Doing so would obtain or result in a higher coding efficiency. For instance, when encoding a resolution at a target spatial resolution lower than a reference spatial resolution such as the original full resolution of the inbound video 12, a sampled version of the residual is encoded, thereby reducing the number of coefficients. Such a mode could be signaled in the data stream 14 as a new mode or with an additional flag. The signaling could be done per block such as per CTU, i.e., per tree root block, as illustrated in FIG. 26 where blocks 402 were illustrated to be tree root blocks as illustrated at the right hand side of FIG. 26. FIG. 29 presents an example where a flag, namely res_subsampled_flag, signals whether resampling is applied or not in which case, for instance, merely two possible values for the target spatial resolution for the various blocks exist. Alternatively, a further syntax element not shown in FIG. 29, may be signaled in the data stream if the flag of FIG. 29 is set, the syntax element then indicating the target spatial resolution differing from the reference spatial resolution, with the flag of FIG. 29 being not set indicating that the block which this flag refers to being of the reference spatial resolution, i.e., no resampling is necessary.

FIG. 29 illustrates that this flag could be transmitted on a transform block level, but a transmission in a coding unit level at which the prediction modes, i.e., intra/inter-prediction mode, are varied and signaled, would be possible as well. Thus, according to FIG. 30, the flag of FIG. 29 would not be repeated at every smaller block which would increase the signaling. All residual_coding( ) syntax within a CTU could use the same flag, for instance.

Thus, the flags of FIGS. 20 and 30 represent a possibility for signaling the variation of the target spatial resolution within each picture.

FIG. 31 illustrates that the aforementioned flag res_subsampled_flag may be transmitted not for every block a certain picture is partitioned into. As explained in the above description, a picture may be sub-divided by encoder and decoder into blocks of varying size and according to the example of FIG. 31, it may be signaled for the whole video or for some sequence of pictures thereof, that the indication of varying the target spatial resolution compared to some reference spatial resolution is merely transmitted for blocks of a certain size within a certain block size range, for instance. FIG. 31 provides an example. Here, sub-sampling of a residual is assumed to be more beneficial for blocks of a given size, e.g., bring more gains for large blocks. Accordingly, syntax within the data stream 14 is added so as to avoid that the syntax for varying the target spatial resolution for all blocks a certain picture is partitioned into is avoided. In even other words, the example of FIG. 31 avoids that the signaling overhead spent for varying the target spatial resolution over a certain picture is detrimental for the rate-distortion gains. According to the example of FIG. 31, the data stream 14 signals for a sequence of pictures that the target spatial resolution is signaled for the pictures of the sequence of pictures in the following manner: the pictures are partitioned into blocks of varying size, and all blocks outside a predetermined range of block sizes are encoded/decoded at a reference spatial resolution. Merely for the other blocks having a block size within the predetermined block size range it is signaled in the data stream 14 as to which target spatial resolution is chosen for the respective block. Accordingly, in FIG. 31, the SPS contains a flag, mixed_resolution_enabled_flag, which switches on the target spatial resolution variation spatially across the pictures, and if same is set, a block size range is determined by two syntax elements, namely log 2_min_res_subsampled_flag_present_block_size_minus3 and log_diff_max_min_res_subsampled_flag_present_coding_block_size. Taking the CU wise transmission of the target spatial resolution indication, namely exemplarily by way of res_subsampled_flag, FIG. 32 shows that the respective syntax element indicating the target spatial resolution for a certain block will only be transmitted in case of the block size falling to the signaled predetermined block size range.

FIG. 33 relates to the following issue. The aforementioned res_subsampled_flag per se cannot provide a better rate-distortion performance as down sampling and up sampling only leads to a distortion; but it would be useful to describe how much better the sampled blocks are encoded. It would, accordingly, be possible to add a delta_qp, i.e., a variation of the quantization parameter compared to non-resampled blocks, for those blocks having a target spatial resolution other than the reference spatial resolution. FIG. 33 represents an example where this is transmitted in the data stream 14 as part of the SPS, but a transmission within the PPS would be possible as well. That is, here, a syntax element delta_qp_4_subsampled_blocks, would indicate for those blocks a certain picture sub-divided into which are subject to resampling, i.e., are not equal to the target spatial resolution, as to which quantization step size shall be applied or, to be more precise, which offset compared to the quantization step size used for the non-resampled blocks encoded at the reference spatial resolution.

Similarly, a 2:1 subsampling factor could be performed or the subsampling factor could be flexible and signaled. More than one could be signaled and be fixed per CTU size, or per temporal level for different frames.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Same embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for video decoding, the method comprising:
- determining a value of a flag;
- determining, based on the value of the flag, that reference picture resampling is enabled and that aspect ratios are allowed to change between a current picture and a reference picture;
- determining that an aspect ratio of the reference picture is different than an aspect ratio of the current picture;
- resampling a portion of the reference picture to generate a resampled portion of the reference picture; and
- predicting the current picture using the resampled portion of the reference picture.

2. The method of claim 1, wherein determining that the aspect ratio of the reference picture is different than the aspect ratio of the current picture, comprises:
- determining that a size parameter of the reference picture is different from a corresponding size parameter of the current picture; and
- in response to the determination that the size parameter of the reference picture is different from the corresponding size parameter of the current picture, resampling the portion of the reference picture,
- wherein the size parameter of the reference picture and the size parameter of the current picture includes at least one of picture height in luma samples and picture width in luma samples.

3. The method of claim 1, wherein:
- the flag is a first flag; and
- the method further comprises decoding a second flag that indicates whether aspect ratios changes.

4. The method of claim 1, further comprising:
- determining whether a size of the reference picture and a size of the current picture are different;
- in response to a determination that the reference picture size and the current picture size are different, deriving a ratio representing the reference picture size and the current picture size; and
- resampling the portion of the reference picture based on the ratio.

5. The method of claim 1, wherein resampling the portion of the reference picture comprises:
- up-sampling the portion of the reference picture to correspond to a spatial resolution of the current picture, when the spatial resolution of the current picture is larger than the spatial resolution of the reference picture; and
- down-sampling the portion of the reference picture to correspond to the spatial resolution of the current picture, when the spatial resolution of the current picture is less than the spatial resolution of the reference picture.

6. The method of claim 1, further comprising:
- determining that a temporal distance between the reference picture and the current picture is less than a random access distance, such that a random access point is not positioned between the reference picture and the current picture.

7. The method of claim 1, wherein:
- the flag further indicates that spatial resolution is allowed to change within a coded video sequence, and
- a distance between a random-access frame and the current picture is larger than a distance between the reference picture and the current picture.

8. An electronic device for video decoding, the electronic device comprising a processor configured to:
- determine a value of a flag;
- determine, based on the value of the flag, that reference picture resampling is enabled and that aspect ratios are allowed to change between a current picture and a reference picture;
- determine that an aspect ratio of the reference picture is different than an aspect ratio of the current picture;
- resample a portion of the reference picture to generate a resampled portion of the reference picture; and
- predict the current picture using the resampled portion of the reference picture.

9. The electronic device of claim 8, wherein to determine that the aspect ratio of the reference picture is different than the aspect ratio of the current picture, the processor is configured to:
- determine that a size parameter of the reference picture is different from a corresponding size parameter of the current picture; and
- in response to the determination that the size parameter of the reference picture is different from the corresponding size parameter of the current picture, resample the portion of the reference picture,
- wherein the size parameter of the reference picture and the size parameter of the current picture includes at least one of picture height in luma samples and picture width in luma samples.

10. The electronic device of claim 8, wherein:
- the flag is a first flag; and
- the processor is further configured do decode a second flag that indicates whether aspect ratios changes.

11. The electronic device of claim 8, wherein the processor is further configured to:
- determine whether a size of the reference picture and a size of the current picture are different;
- in response to a determination that the reference picture size and the current picture size are different, derive a ratio representing the reference picture size and the current picture size; and
- resample the portion of the reference picture based on the ratio.

12. The electronic device of claim 8, wherein to resample the portion of the reference picture, the processor is configured to:
- up-sample the portion of the reference picture to correspond to a spatial resolution of the current picture, when the spatial resolution of the current picture is larger than the spatial resolution of the reference picture; and
- down-sample the portion of the reference picture to correspond to the spatial resolution of the current picture, when the spatial resolution of the current picture is less than the spatial resolution of the reference picture.

13. The electronic device of claim 8, wherein the processor is further configured to:

determining that a temporal distance between the reference picture and the current picture is less than a random access distance, such that a random access point is not positioned between the reference picture and the current picture.

14. The electronic device of claim 8, wherein:

the flag further indicates that spatial resolution is allowed to change within a coded video sequence, and a distance between a random-access frame and the current picture is larger than a distance between the reference picture and the current picture.

15. A non-transitory, computer-readable medium storing instructions that, when executed cause at least one processor of an electronic device to:

determine a value of a flag;

determine, based on the value of the flag, that reference picture resampling is enabled and that aspect ratios are allowed to change between a current picture and a reference picture;

determine that an aspect ratio of the reference picture is different than an aspect ratio of the current picture;

resample a portion of the reference picture to generate a resampled portion of the reference picture; and predict the current picture using the resampled portion of the reference picture.

16. The non-transitory, computer-readable medium of claim 15, further containing instructions that when executed cause the at least one processor to:

determine that a size parameter of the reference picture is different from a corresponding size parameter of the current picture; and in response to the determination that the size parameter of the reference picture is different from the corresponding size parameter of the current picture, resample the portion of the reference picture, wherein the size parameter of the reference picture and the size parameter of the current picture includes at least one of picture height in luma samples and picture width in luma samples.

17. The non-transitory, computer-readable medium of claim 15, wherein:

the flag is a first flag; and the processor is further configured do decode a second flag that indicates whether aspect ratios changes.

18. The non-transitory, computer-readable medium of claim 15, further containing instructions that when executed cause the at least one processor to:

determine whether a size of the reference picture and a size of the current picture are different;

in response to a determination that the reference picture size and the current picture size are different, derive a ratio representing the reference picture size and the current picture size; and resample the portion of the reference picture based on the ratio.

19. The non-transitory, computer-readable medium of claim 15, wherein the instructions that when executed cause the at least one processor to resample the portion of the reference picture, comprise instructions that when executed cause the at least one processor to:

up-sample the portion of the reference picture to correspond to a spatial resolution of the current picture, when the spatial resolution of the current picture is larger than the spatial resolution of the reference picture; and down-sample the portion of the reference picture to correspond to the spatial resolution of the current picture, when the spatial resolution of the current picture is less than the spatial resolution of the reference picture.

20. The non-transitory, computer-readable medium of claim 15, further containing instructions that when executed cause the at least one processor to:

determining that a temporal distance between the reference picture and the current picture is less than a random access distance, such that a random access point is not positioned between the reference picture and the current picture.

21. The non-transitory, computer-readable medium of claim 15, wherein:

the flag further indicates that spatial resolution is allowed to change within a coded video sequence, and a distance between a random-access frame and the current picture is larger than a distance between the reference picture and the current picture.

22. A method for video encoding, the method comprising:

generating a flag with a value indicating that reference picture resampling is enabled and that aspect ratios are allowed to change between a current picture and a reference picture;

determine that an aspect ratio of the reference picture is different than an aspect ratio of the current picture;

resampling a portion of the reference picture to generate a resampled portion of the reference picture; and encoding the current picture using the resampled portion of the reference picture.

23. The method of claim 22, further comprising:

determining that a temporal distance between the reference picture and the current picture is less than a random access distance, such that a random access point is not positioned between the reference picture and the current picture.

24. The method of claim 22, wherein:

the flag is a first flag, and the method further comprises generating a second flag indicating whether aspect ratios of pictures included in a sequence parameter set are allowed to be different.

25. An electronic device for video encoding, the electronic device comprising a processor configured to:

generate a flag with a value indicating that reference picture resampling is enabled and that aspect ratios are allowed to change between a current picture and a reference picture;

determine that an aspect ratio of the reference picture is different than an aspect ratio of the current picture;

resample a portion of the reference picture to generate a resampled portion of the reference picture; and encode the current picture using the resampled portion of the reference picture.

26. The electronic device of claim 25, wherein the processor is further configured to:

determine that a temporal distance between the reference picture and the current picture is less than a random access distance, such that a random access point is not positioned between the reference picture and the current picture.

27. The electronic device of claim 25, wherein:

the flag is a first flag, and the processor is further configured to generate a second flag indicating whether aspect ratios of pictures included in a sequence parameter set are allowed to be different.

28. A non-transitory, computer-readable medium storing instructions that, when executed cause at least one processor of an electronic device to:

generate a flag with a value indicating that reference picture resampling is enabled and that aspect ratios are allowed to change between a current picture and a reference picture;

determine that an aspect ratio of reference picture is different than an aspect ratio of the current picture;

resample a portion of the reference picture to generate a resampled portion of the reference picture; and encode the current picture using the resampled portion of the reference picture.

29. The non-transitory, computer-readable medium of claim 28, further containing instructions that when executed cause the at least one processor to:

determine that a temporal distance between the reference picture and the current picture is less than a random access distance, such that a random access point is not positioned between the reference picture and the current picture.

30. The non-transitory, computer-readable medium of claim 28, wherein:

the flag is a first flag, and the instructions that when executed further cause the at least one processor to generate a second flag indicating whether aspect ratios of pictures included in a sequence parameter set are allowed to be different.

* * * * *